United States Patent
Ohno et al.

(10) Patent No.: US 10,471,788 B2
(45) Date of Patent: Nov. 12, 2019

(54) ELECTROMAGNETIC SUSPENSION APPARATUS

(71) Applicant: HONDA MOTOR CO., LTD., Tokyo (JP)

(72) Inventors: Satoshi Ohno, Wako (JP); Atsuhiko Yoneda, Wako (JP); Takafumi Kato, Wako (JP); Tomoya Toyohira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/005,973

(22) Filed: Jun. 12, 2018

(65) Prior Publication Data

US 2018/0361816 A1   Dec. 20, 2018

(30) Foreign Application Priority Data

Jun. 16, 2017  (JP) .................. 2017-119121

(51) Int. Cl.
| | |
|---|---|
| B60G 17/016 | (2006.01) |
| B60G 5/02 | (2006.01) |
| B60G 13/00 | (2006.01) |
| B60G 17/0165 | (2006.01) |

(52) U.S. Cl.
CPC ............ *B60G 5/02* (2013.01); *B60G 13/001* (2013.01); *B60G 17/0165* (2013.01); *B60G 2200/132* (2013.01); *B60G 2200/422* (2013.01); *B60G 2202/20* (2013.01); *B60G 2202/40* (2013.01); *B60G 2204/419* (2013.01); *B60G 2204/62* (2013.01); *B60G 2400/204* (2013.01)

(58) Field of Classification Search
CPC .............. B60G 17/106; B60G 17/0165; B60G 2204/62; B60G 2400/204
See application file for complete search history.

(56) References Cited

FOREIGN PATENT DOCUMENTS

| | | |
|---|---|---|
| JP | 2010-126044 A | 6/2010 |
| JP | 2010-132222 A | 6/2010 |
| JP | 2010-137796 A | 6/2010 |
| JP | 2011-189774 A | 9/2011 |
| JP | 2014-227033 A | 12/2014 |

OTHER PUBLICATIONS

Japanese Office Action dated Nov. 13, 2018 with English Translation, 7 pages.

*Primary Examiner* — Ruth Ilan
(74) *Attorney, Agent, or Firm* — Rankin, Hill & Clark LLP

(57) ABSTRACT

An object of the present invention is to obtain an electromagnetic suspension apparatus capable of quickly reducing an influence of a mechanical frictional force generated in each part of an electromagnetic actuator. The electromagnetic suspension apparatus includes an electromagnetic actuator that generates a driving force related to a damping operation and an expansion and contraction, an information acquisition unit that acquires vehicle state information including a stroke speed of the electromagnetic actuator, an equivalent frictional force calculation unit that calculates an equivalent frictional force of the electromagnetic actuator based on the vehicle state information, and an ECU that calculates a target driving force of the electromagnetic actuator and controls the driving force of the electromagnetic actuator using the calculated target driving force. The ECU corrects the target driving force based on the equivalent frictional force calculated by the equivalent frictional force calculation unit.

8 Claims, 10 Drawing Sheets

ELECTROMAGNETIC SUSPENSION APPARATUS

CROSS REFERENCE TO RELATED APPLICATIONS

This application claims the foreign priority benefit under Title 35, United States Code, § 119 (a)-(d) of Japanese Patent Application No. 2017-119121, filed on Jun. 16, 2017, the disclosure of which is herein incorporated by reference in its entirety.

TECHNICAL FIELD

The present invention relates to an electromagnetic suspension apparatus including an electromagnetic actuator which is provided in parallel with a spring member provided between a vehicle body and a wheel of a vehicle and generates a driving force related to vibration damping of the vehicle body.

BACKGROUND ART

Conventionally, there has been known an electromagnetic suspension apparatus including an electromagnetic actuator which is provided in parallel with a spring member provided between a vehicle body and a wheel of a vehicle and generates a driving force related to vibration damping of the vehicle body by an electric motor (for example, see Japanese Patent Application Publication No. 2010-132222). The electromagnetic actuator is configured to include a ball screw mechanism in addition to the electric motor. The electromagnetic actuator operates to generate the driving force related to the vibration damping of the vehicle body by converting rotational motion of the electric motor into linear motion of the ball screw mechanism.

In the electromagnetic suspension apparatus according to Japanese Patent Application Publication No. 2010-132222, a frictional force is generated in an internal mechanism such as a ball screw mechanism. For example, when the vehicle starts in a low temperature environment, the frictional force is large because viscosity of grease present in the internal mechanism of the electromagnetic actuator is high. In this case, as a result of failing to appropriately transmit the driving force generated by the electromagnetic actuator to a sprung member and an unsprung member, ride comfort and steering stability may be deteriorated.

In order to solve problems derived from such a frictional force, in the electromagnetic actuator according to Japanese Patent Application Publication No. 2011-189774, the electric motor is driven by a preset friction measurement driving force at the start of the vehicle, the frictional force of the electromagnetic actuator is calculated from a rotation angle of the electric motor at this time, and a target driving force of the electromagnetic actuator is corrected based on the calculated frictional force. With the electromagnetic actuator according to Japanese Patent Application Publication No. 2011-189774, it is possible to eliminate a problem associated with insufficient transmission of driving force derived from the frictional force which is remarkably generated at the time of starting the vehicle.

SUMMARY OF INVENTION

Technical Problem

In the invention of the electromagnetic actuator according to Japanese Patent Application Publication No. 2011-189774, the electric motor is driven by the friction measurement driving force, the frictional force of the electromagnetic actuator is calculated from the rotation angle of the electric motor at this time, and the target driving force of the electromagnetic actuator is corrected based on the calculated frictional force, and thus the problem associated with the insufficient transmission of the driving force is solved by reducing a mechanical frictional force generated in each part of the electromagnetic actuator. However, the invention of the electromagnetic actuator according to Japanese Patent Application Publication No. 2011-189774 has room for further improvement in the following points. That is, according to a study by inventors of the present invention, it has been found that there are some cases where it is advantageous to improve the ride comfort and the steering stability when the frictional force generated in each part of the electromagnetic actuator is moderately present, depending on a state of the vehicle or a road surface, and a driver's operation state.

The present invention has been made in view of the above circumstances, and an object of the present invention is to provide an electromagnetic suspension apparatus capable of effectively using the frictional force of the electromagnetic actuator.

Solution to Problem

In order to achieve the above object, an electromagnetic suspension apparatus according to an aspect of the present invention includes an electromagnetic actuator that is provided in parallel with a spring member provided between a vehicle body and a wheel of a vehicle and generates a driving force related to vibration damping of the vehicle body, an information acquisition unit that acquires at least one of vehicle state information on a stroke speed of the electromagnetic actuator, a sprung speed, an unsprung speed, a roll velocity, and a pitch velocity, an equivalent frictional force calculation unit that calculates an equivalent frictional force of the electromagnetic actuator based on the vehicle state information acquired by the information acquisition unit, and a driving force control unit that calculates a target driving force of the electromagnetic actuator and controls a driving force of the electromagnetic actuator using the calculated target driving force, wherein the driving force control unit corrects the target driving force based on the equivalent frictional force calculated by the equivalent frictional force calculation unit.

Advantageous Effects of Invention

According to the present invention, it is possible to obtain an electromagnetic suspension apparatus capable of effectively use a frictional force of an electromagnetic actuator.

DESCRIPTION OF EMBODIMENTS

Figure 1:
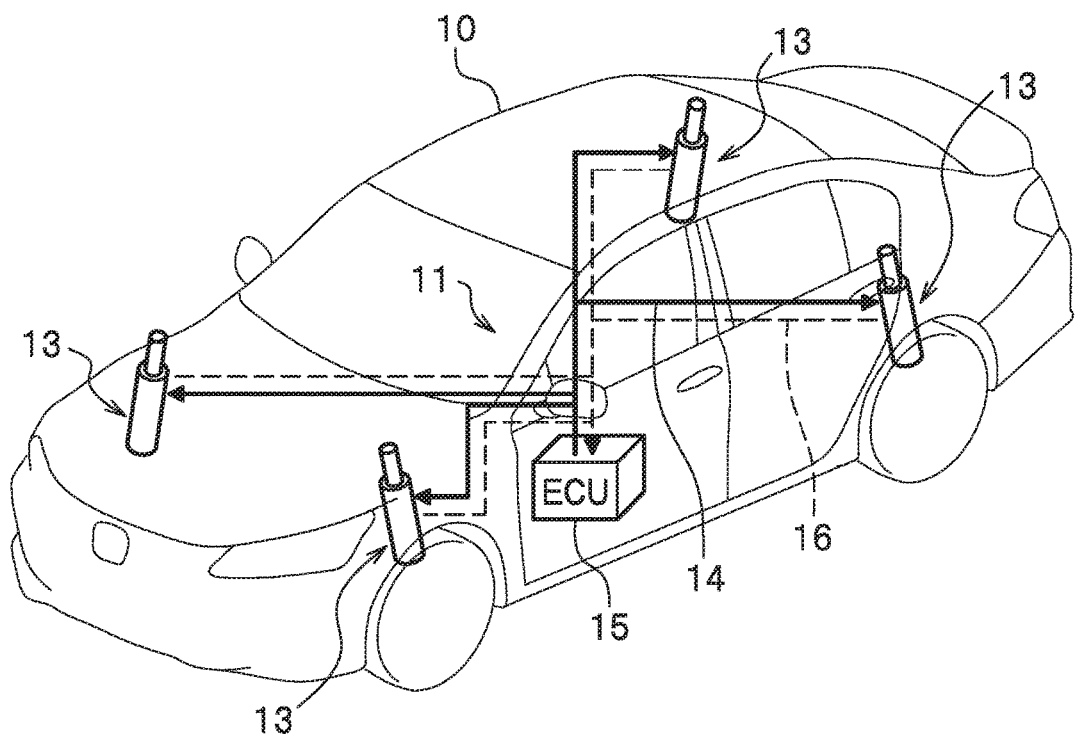
FIG. 1 is an overall configuration diagram of an electromagnetic suspension apparatus according to the present invention.

An electromagnetic suspension apparatus according to a first to seventh embodiments of the present invention will be described in detail with reference to the drawings below. In the following drawings, the same members or corresponding members are denoted by the same reference numerals. In addition, the size and shape of the member may be schematically illustrated by being deformed or exaggerated for convenience of explanation.

[Basic Configuration Common to Electromagnetic Suspension Apparatus 11 According to First to Seventh Embodiments of the Present Invention]

Figure 2:
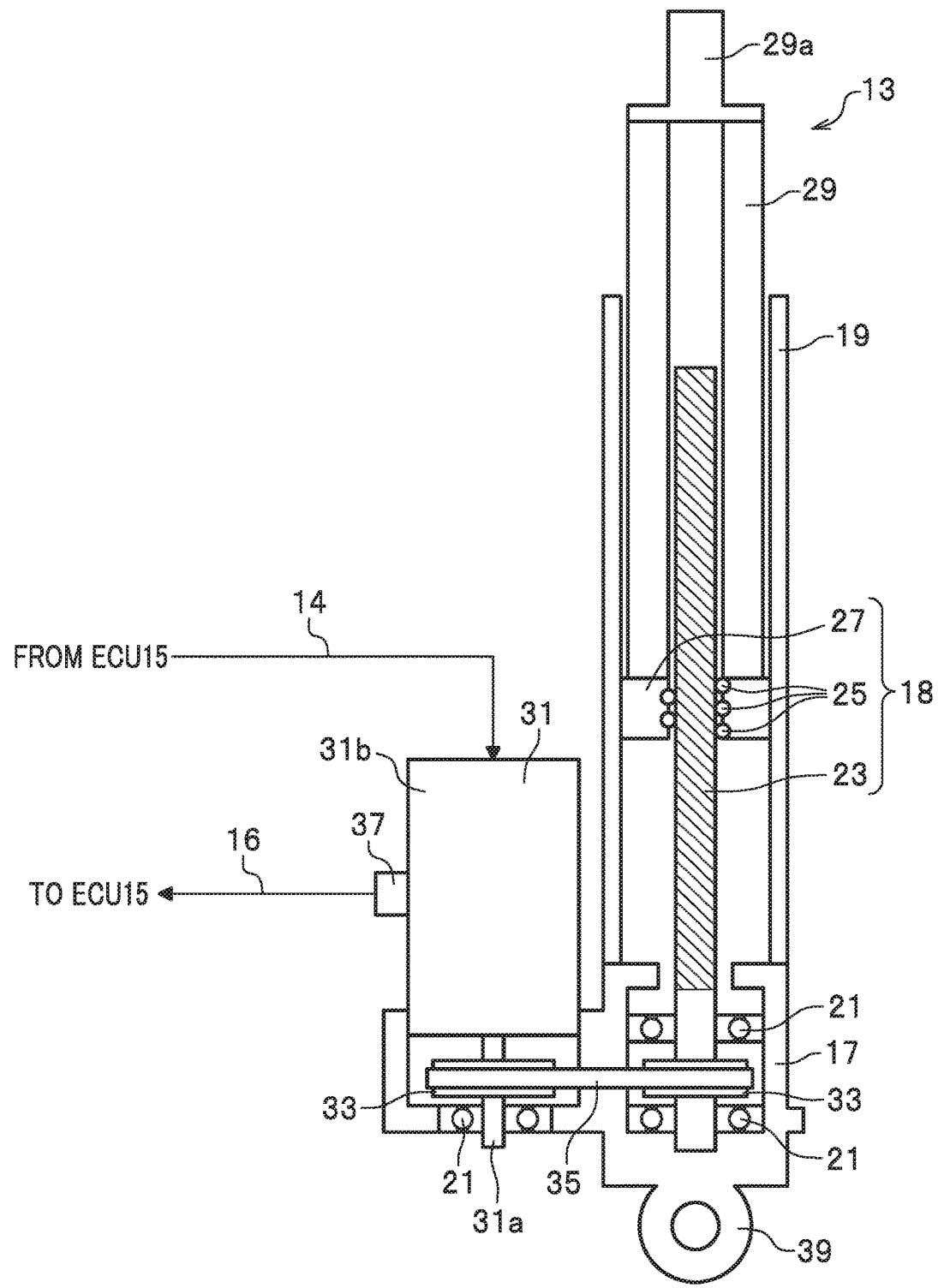
FIG. 2 is a partial cross-sectional view of an electromagnetic actuator provided in the electromagnetic suspension apparatus.

First, a basic configuration common to an electromagnetic suspension apparatus 11 according to the first to seventh embodiments of the present invention will be described with reference to FIGS. 1, 2. FIG. 1 is an overall configuration diagram common to the electromagnetic suspension apparatus 11 according to the first to seventh embodiments of the present invention. FIG. 2 is a partial cross-sectional view of an electromagnetic actuator 13 constituting a part of the electromagnetic suspension apparatus 11.

As shown in FIG. 1, the electromagnetic suspension apparatus 11 according to the first to seventh embodiments of the present invention includes a plurality of electromagnetic actuators 13 respectively provided for wheels of a vehicle 10, and an electronic control unit (hereinafter referred to as an "ECU") 15. The plurality of electromagnetic actuators 13 and the ECU 15 are connected to each other via a power supply line 14 (see a solid line in FIG. 1) for supplying drive control power from the ECU 15 to the plurality of electromagnetic actuators 13 and via a signal line 16 (see a dashed line in FIG. 1) for transmitting a stroke position of the electromagnetic actuator 13 from each of the plurality of electromagnetic actuators 13 to the ECU 15. In the present embodiment, four electromagnetic actuators 13 are respectively provided for the wheels including front wheels (left front wheel/right front wheel) and rear wheels (left rear wheel/right rear wheel).

In the embodiments of the present invention, each of the plurality of electromagnetic actuators 13 has a common configuration. Therefore, the plurality of electromagnetic actuators 13 will be described by describing a configuration of one electromagnetic actuator 13.

As shown in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports a base end of the ball screw shaft 23 rotatably axially via the ball bearing 21. The outer tube 19 is provided on the base housing 17 and accommodates a ball screw mechanism 18 including the ball screw shaft 23, the plurality of balls 25, and the nut 27. The plurality of balls 25 roll along a screw groove of the ball screw shaft 23. The nut 27 is engaged with the ball screw shaft 23 via the plurality of balls 25, and converts rotational motion of the ball screw shaft 23 into linear motion. The inner tube 29 connected to the nut 27 is integrated with the nut 27 and displaced in an axial direction of the outer tube 19.

As shown in FIG. 2, the electromagnetic actuator 13 includes the electric motor 31, a pair of pulleys 33, and a belt 35 in order to transmit a rotational driving force to the ball screw shaft 23. The electric motor 31 is provided on the base housing 17 so as to be arranged in parallel with the outer tube 19. The pulleys 33 are respectively attached to a motor shaft 31a of the electric motor 31 and the ball screw shaft 23. The belt 35 for transmitting the rotational driving force of the electric motor 31 to the ball screw shaft 23 is suspended on the pair of pulleys 33.

The electric motor 31 is provided with a resolver 37 for detecting a rotation angle signal of the electric motor 31. The rotation angle signal of the electric motor 31 detected by the resolver 37 is sent to the ECU 15 via the signal line 16. In the present embodiment, a rotation angle of the electric motor 31 can be replaced with the stroke position of the electromagnetic actuator 13. This is because the stroke position of the electromagnetic actuator 13 is displaced to an expansion side or a contraction side (see FIG. 2) according to a displacement of the rotation angle of the electric motor 31. The electric motor 31 is controlled to be rotationally driven in accordance with the drive control power to be supplied to each of the plurality of electromagnetic actuators 13 via the power supply line 14 by the ECU 15.

As shown in FIG. 2, in the present embodiment, a dimension in the axial direction of the electromagnetic actuator 13 is shortened by employing a layout in which the motor shaft 31a of the electric motor 31 and the ball screw shaft 23 are arranged substantially in parallel to be connected to each other. However, another layout may be employed in which the motor shaft 31a of the electric motor 31 and the ball screw shaft 23 are coaxially arranged to be connected to each other.

As shown in FIG. 2, in the electromagnetic actuator 13 according to the present embodiment, a connecting portion 39 is provided at a lower end of the base housing 17. The connecting portion 39 is connected and fixed to an unsprung member (not shown: a lower arm, a knuckle, etc. on the wheel side). On the other hand, the upper end 29a of the inner tube 29 is connected and fixed to a sprung member (not shown: a strut tower, etc. on a vehicle body side). In short, the electromagnetic actuator 13 is arranged in parallel with a spring member (not shown) provided between the vehicle body and the wheel of the vehicle 10. The sprung member is provided with a sprung acceleration sensor 41 for detecting an acceleration of the vehicle body (sprung member) in a stroke direction of the electromagnetic actuator 13. Further, the unsprung member is provided with an unsprung acceleration sensor 42 for detecting the acceleration of the wheel (unsprung member) in the stroke direction of the electromagnetic actuator 13.

The electromagnetic actuator 13 configured as described above operates as follows. That is, for example, it is assumed that an external force related to an upward vibration is input to the connecting portion 39 from the wheel side of the vehicle 10. In this case, the inner tube 29 and the nut 27 try to integrally descend with respect to the outer tube 19 to which the external force related to the upward vibration is applied. In response to this, the ball screw shaft 23 tries to rotate in a direction following the nut 27 descending. At this time, the rotational driving force of the electric motor 31 in a direction preventing the nut 27 from descending is generated. The rotational driving force of the electric motor 31 is transmitted to the ball screw shaft 23 via the belt 35. In this way, the vibration transmitted from the wheel side to the vehicle body side is attenuated by applying a damping force (force in a direction different from a direction of the stroke speed) which is a reaction force against the external force related to the upward vibration to the ball screw shaft 23.

[Internal Configuration of ECU 15]

Figure 3:
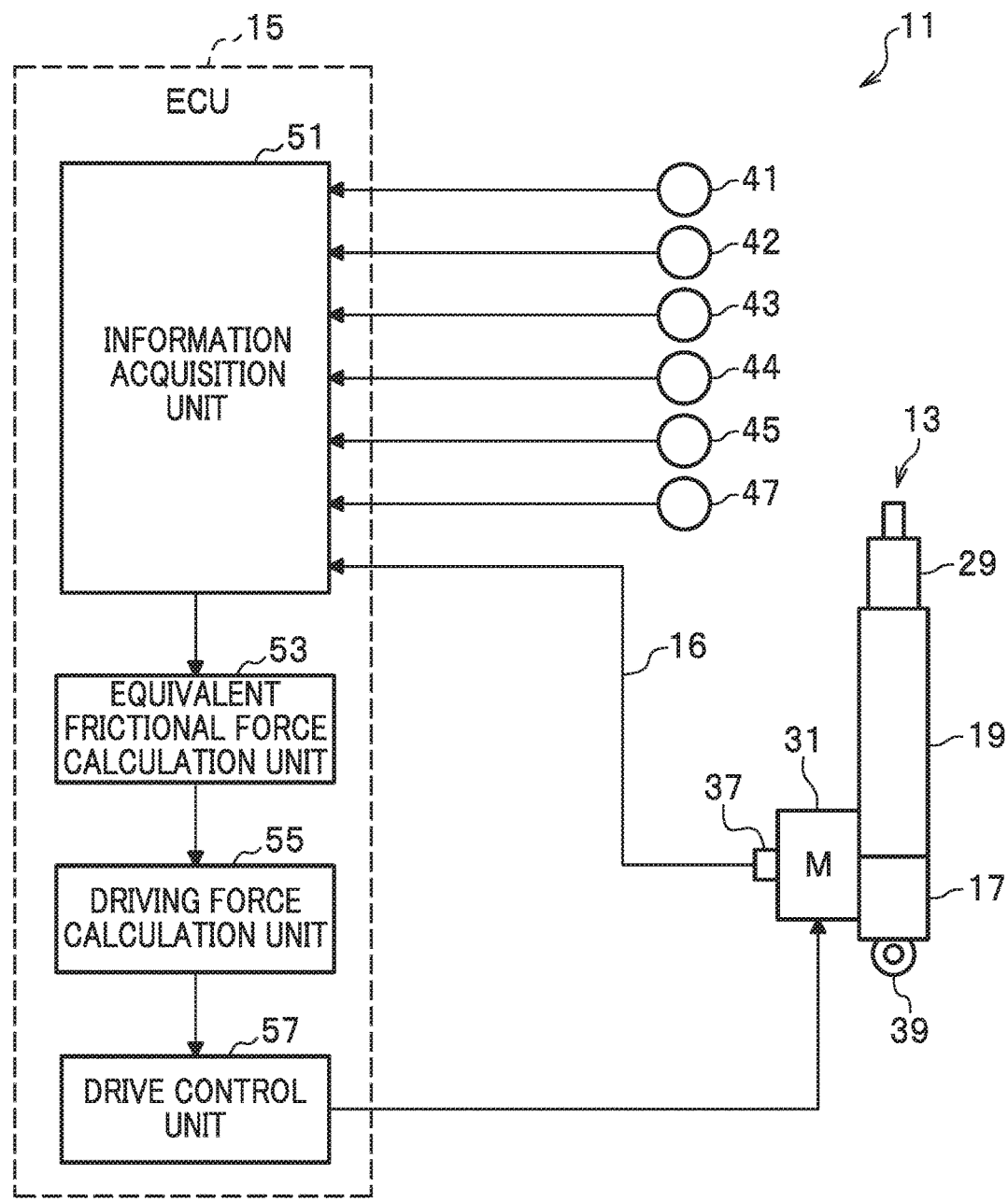
FIG. 3 is an internal configuration diagram of an ECU provided in the electromagnetic suspension apparatus.

Next, an internal configuration of the ECU 15 provided in the electromagnetic suspension apparatus 11 will be described with reference to FIG. 3. FIG. 3 is an internal configuration diagram of the ECU 15 provided in the electromagnetic suspension apparatus 11.

The ECU 15 includes a microcomputer for performing various arithmetic processing. The ECU 15 controls driving of each of the plurality of electromagnetic actuators 13 based on the rotation angle of the electric motor 31 detected by the resolver 37, that is, the stroke position or the like of the electromagnetic actuator 13, so as to have a driving force control function for generating the driving force related to vibration damping of the vehicle body. The ECU 15 corresponds to a "driving force control unit" of the present invention. In order to realize such a driving force control function, the ECU 15 includes an information acquisition unit 51, an equivalent frictional force calculation unit 53, a driving force calculation unit 55, and a drive control unit 57 as shown in FIG. 3.

The information acquisition unit 51 acquires the rotation angle of the electric motor 31 detected by the resolver 37, that is, information on the stroke position of the electromagnetic actuator 13. Further, the information acquisition unit 51 acquires information on a sprung acceleration detected by the sprung acceleration sensor 41, an unsprung acceleration detected by the unsprung acceleration sensor 42, a roll velocity detected by a roll velocity sensor 43, a pitch velocity detected by a pitch velocity sensor 44, a yaw rate Y detected by a yaw rate sensor 47, and a vehicle speed V detected by a vehicle speed sensor 45.

Further, the information acquisition unit 51 acquires the stroke speed (hereinafter simply referred to as "stroke speed") of the electromagnetic actuator 13 by time-differentiating a displacement of the stroke position of the electromagnetic actuator 13. Furthermore, the information acquisition unit 51 acquires a sprung speed and an unsprung speed by respectively by time-integrating the sprung acceleration and the unsprung acceleration. Vehicle state information including the stroke speed of the electromagnetic actuator 13, the sprung speed, the unsprung speed, the roll velocity, the pitch velocity, the yaw rate Y, and the vehicle speed V acquired by the information acquisition unit 51 is sent to the equivalent frictional force calculation unit 53.

The equivalent frictional force calculation unit 53 calculates an equivalent frictional force equivalent to a frictional force of the electromagnetic actuator 13 based on the vehicle state information acquired by the information acquisition unit 51. Information on the equivalent frictional force calculated by the equivalent frictional force calculation unit 53 is sent to the driving force calculation unit 55. A content of calculation performed by the equivalent frictional force calculation unit 53 will be described in detail below.

The driving force calculation unit 55 inputs the vehicle state information acquired by the information acquisition unit 51, and calculates a target driving force with reference to the vehicle state information, and a damping force map 61, first to fifth frictional force maps 63A, 63B, 63C, 63D, 63E, and the like described below. A driving force control signal for realizing the target driving force which is a calculation result by the driving force calculation unit 55 is sent to the drive control unit 57. A content of calculation performed by the driving force calculation unit 55 will be described in detail below.

The drive control unit 57 supplies the drive control power to the electric motors 31 respectively provided in the plurality of electromagnetic actuators 13 according to the driving force control signal sent from the driving force calculation unit 55, and thus independently controls driving of each of the plurality of electromagnetic actuators 13. For example, an inverter control circuit can be suitably used for generating the drive control power to be supplied to the electric motor 31.

[Block Configuration of Equivalent Frictional Force Calculation Unit 53, Driving Force Calculation Unit 55, and their Surroundings According to First Embodiment]

Figure 4A:
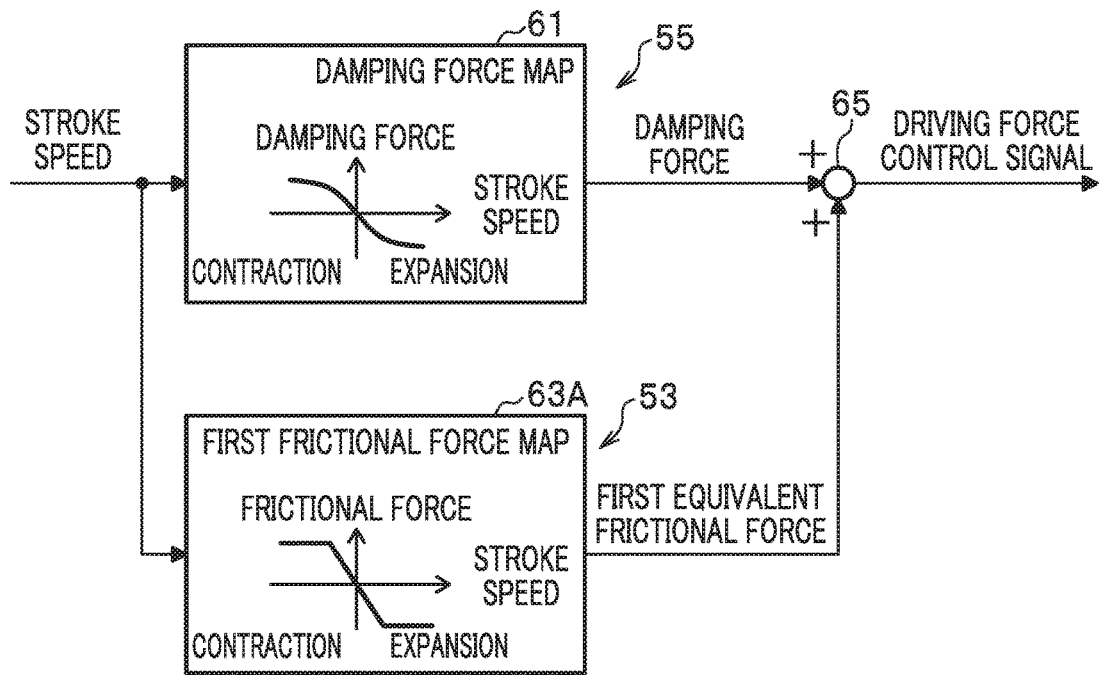
FIG. 4A is a block configuration diagram of an equivalent frictional force calculation unit, a driving force calculation unit, and their surroundings of an ECU provided in the electromagnetic suspension apparatus according to a first embodiment.
Figure 4B:
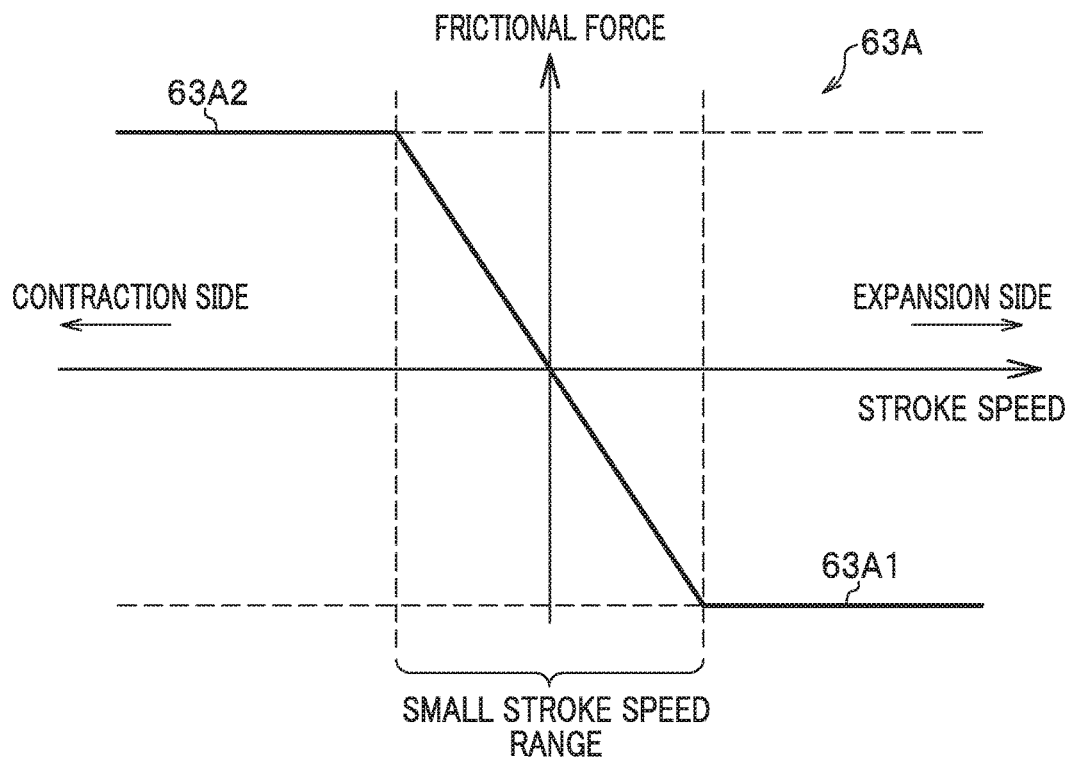
FIG. 4B is an explanatory diagram of a first frictional force map included in the equivalent frictional force calculation unit according to the first embodiment.

Next, a block configuration of the equivalent frictional force calculation unit 53, the driving force calculation unit 55, and their surroundings of the ECU 15 included in the electromagnetic suspension apparatus 11 according to the first embodiment will be described with reference to FIGS. 4A, 4B. FIG. 4A is a block configuration diagram of the equivalent frictional force calculation unit 53, the driving force calculation unit 55, and their surroundings according to the first embodiment. FIG. 4B is an explanatory diagram of a first frictional force map 63A included in the equivalent frictional force calculation unit 53 according to the first embodiment.

As shown in FIG. 4A, the driving force calculation unit 55 according to the first embodiment includes the damping force map 61 and an adder 65.

As shown in FIG. 4A, a value of the damping force which changes in association with a change in the stroke speed is stored in the damping force map 61. Note that the value of the damping force is actually stored as a value of a damping force control current. In an example shown in FIG. 4A, as the stroke speed increases toward the expansion side, the damping force directed to the contraction side increases, while as the stroke speed increases toward the contraction side, the damping force directed to the expansion side increases. This characteristic conforms to a characteristic of a hydraulic damper which has been conventionally used. When the stroke speed is zero, the corresponding damping force is also zero. The driving force calculation unit 55 according to the first embodiment calculates the value of the damping force corresponding to the stroke speed with reference to the stroke speed acquired by the information acquisition unit 51 and above-described stored contents of the damping force map 61. The value of the damping force calculated in this way is sent to the adder 65.

As shown in FIG. 4B, a value of the equivalent frictional force which changes in association with the change in the stroke speed is stored in the first frictional force map 63A of the equivalent frictional force calculation unit 53 according to the first embodiment. The first frictional force map 63A is referred to when applying the frictional force equivalent to the mechanical frictional force (force in the direction opposite to the direction of the stroke speed) using the driving force of the electromagnetic actuator 13. In the example shown in FIG. 4B, in a small stroke speed range where an absolute value of the stroke speed is not more than a predetermined value, the equivalent frictional force directed to the contraction side linearly increases as the stroke speed increases toward the expansion side, while the equivalent frictional force directed to the expansion side linearly increases as the stroke speed increases toward the contraction side. When the stroke speed is zero, the value of the equivalent frictional force corresponding to the stroke speed is also zero. Further, in a non-small stroke speed range where the absolute value of the stroke speed exceeds a predetermined value, the equivalent frictional force directed to the contraction side converges to a predetermined limit value 63A1 irrespective of a magnitude of the stroke speed directed to the expansion side, while the equivalent frictional force directed to the expansion side converges to a predetermined limit value 63A2 irrespective of a magnitude of the stroke speed directed to the contraction side. The limit values 63A1, 63A2 of the equivalent frictional force corresponding to the stroke speed are set to appropriate values through experiments and simulations in consideration of a magnitude of the frictional force related to the electromagnetic actuator 13, which varies according to the change in the stroke speed.

The equivalent frictional force calculation unit 53 according to the first embodiment calculates a value of a first equivalent frictional force corresponding to the stroke speed with reference to the stroke speed acquired by the information acquisition unit 51 and the stored contents of the first frictional force map 63A. The value of the first equivalent frictional force calculated in this way is sent to the adder 65.

The adder 65 of the driving force calculation unit 55 according to the first embodiment adds the value of the first equivalent frictional force based on the stroke speed calculated with reference to the first frictional force map 63A to the value of the damping force calculated with reference to the damping force map 61, and thus generates the driving force control signal including the target driving force obtained by integrating the damping force and the first equivalent frictional force. The driving force control signal including the target driving force generated in this way is sent to the drive control unit 57. In response to this, the drive control unit 57 controls driving of the plurality of electromagnetic actuators 13.

[Operation of Electromagnetic Suspension Apparatus 11 According to First Embodiment]

Figure 5:
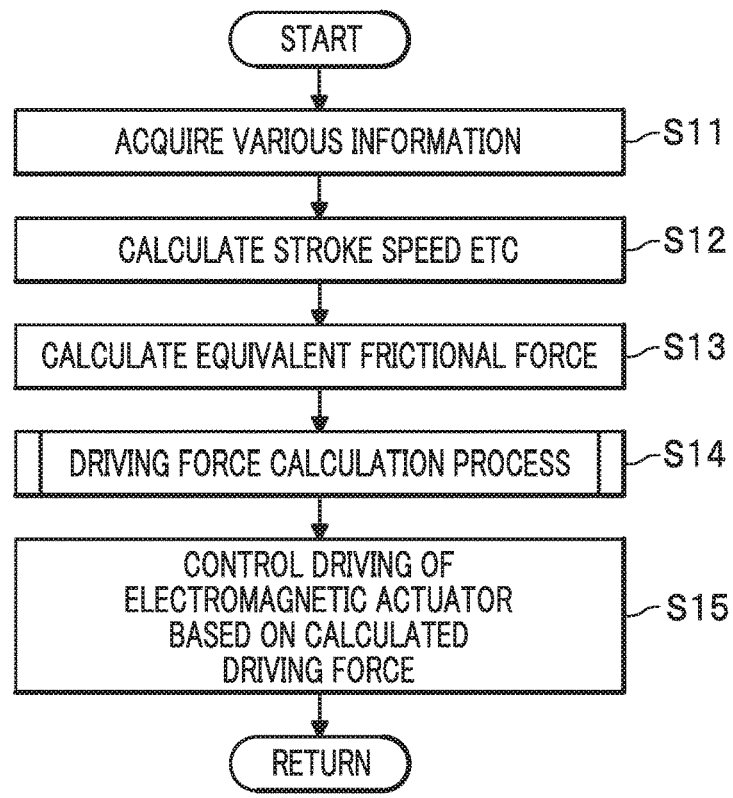
FIG. 5 is a flowchart for explaining an operation common to an electromagnetic suspension apparatus 11 according to the first to seventh embodiments of the present invention.

Next, an operation of the electromagnetic suspension apparatus 11 according to the first embodiment of the present invention will be described with reference to FIG. 5. FIG. 5 is a flowchart for explaining the operation of the electromagnetic suspension apparatus 11 according to the first to seventh embodiments of the present invention.

In Step S11 (various information acquisition) shown in FIG. 5, the information acquisition unit 51 of the ECU 15 acquires the information on the stroke position of the electromagnetic actuators 13.

In Step S12 (stroke speed calculation), the information acquisition unit 51 of the ECU 15 calculates (acquires) information on a time-series signal of the stroke position by time-differentiating the information on the stroke position acquired in Step S11. The information on the time-series signal of the stroke speed acquired by the information acquisition unit 51 is sent to the equivalent frictional force calculation unit 53.

In Step S13 (equivalent frictional force calculation), the equivalent frictional force calculation unit 53 of the ECU 15 inputs the information on the time-series signal of the stroke speed acquired in Step S12, and calculates the value of the first equivalent frictional force corresponding to the stroke speed with reference to this information and the first frictional force map 63A. The information on the first equivalent frictional force calculated in this way is sent to the driving force calculation unit 55.

In Step S14 (driving force calculation process), the driving force calculation unit 55 of the ECU 15 inputs the information on the time-series signal of the stroke speed, and performs the driving force calculation process with reference to this information, the damping force map 61, and the value of the equivalent frictional force corresponding to the stroke speed calculated in Step S13, and thus calculates the driving force control signal including the target driving force.

More specifically, the driving force calculation unit 55 according to the first embodiment calculates the value of the damping force corresponding to the stroke speed with reference to the information on the time-series signal of the stroke speed and the stored contents (damping force changing in association with the change in the stroke speed) of the damping force map 61. Next, the adder 65 of the driving force calculation unit 55 according to the first embodiment adds the value of the first equivalent frictional force corresponding to the stroke speed calculated in Step S13 to the value of the damping force calculated with reference to the damping force map 61, and thus generates the driving force control signal including the target driving force obtained by integrating the damping force and the first equivalent frictional force.

In Step S15, the drive control unit 57 of the ECU 15 supplies the drive control power to the electric motor 31 provided in each of the plurality of electromagnetic actuators 13 in accordance with the driving force control signal obtained by the calculation in Step S14, and thus controls driving of the plurality of electromagnetic actuators 13.

In the electromagnetic suspension apparatus 11 according to the first embodiment, the damping force corresponding to the stroke speed is calculated with reference to the damping force map 61, while the first equivalent frictional force corresponding to the stroke speed is calculated with reference to the first frictional force map 63A, and the electromagnetic actuator 13 is controlled to be driven using the target drive force obtained by integrating the damping force and the first equivalent frictional force calculated in this way.

With the electromagnetic suspension apparatus 11 according to the first embodiment, the value of the first equivalent frictional force equivalent to the mechanical frictional force generated at each part of the electromagnetic actuator 13 due to the stroke speed is calculated, and the target driving force is corrected by adding the value of the first equivalent frictional force thus calculated to the value of the damping force, and thus it is possible to quickly damp the vibration of the vehicle by the equivalent frictional force.

Figure 6:
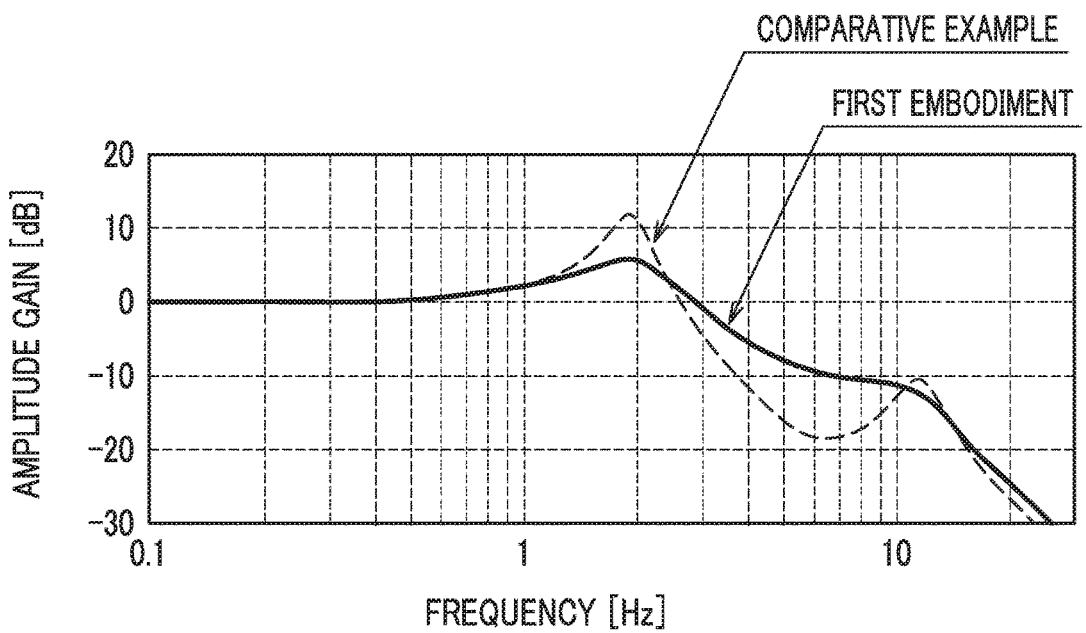
FIG. 6 is an explanatory diagram showing a vibration damping effect of the electromagnetic suspension apparatus according to the first embodiment in comparison with a vibration damping effect according to a comparative example.

Here, a vibration damping effect of the electromagnetic suspension apparatus 11 according to the first embodiment will be described in comparison with the vibration damping effect according to a comparative example based on a target driving force before correction by adding the equivalent frictional force to the damping force, in the small stroke speed range (see FIG. 4B) in which the absolute value of the stroke speed is not more than the predetermined value. FIG. 6 is an explanatory diagram showing the vibration damping effect of the electromagnetic suspension apparatus 11 according to the first embodiment in comparison with the vibration damping effect according to the comparative example.

In the comparative example indicated by a dashed line in FIG. 6, in a frequency band near the sprung resonance frequency (generally about 2 Hz) out of the frequency range not higher than the unsprung resonance frequency (generally about 10 Hz), since a damping component in the small stroke speed range where an influence of the frictional force is large is insufficient, an amplitude gain related to the sprung displacement exhibits a peak value exceeding 10 dB.

In contrast, in the electromagnetic suspension apparatus 11 according to the first embodiment shown by a solid line in FIG. 6, in the frequency band near the sprung resonance frequency out of the frequency range not more than the unsprung resonance frequency, the amplitude gain related to the sprung displacement is sufficiently attenuated to about 5 dB.

With the electromagnetic suspension apparatus 11 of the first embodiment, it is possible to stably obtain the vibration damping effect in the small stroke speed range where the absolute value of the stroke speed is not more than the predetermined value, thereby contributing improvement of ride comfort.

[Block Configuration of Equivalent Frictional Force Calculation Unit 53, Driving Force Calculation Unit 55, and their Surroundings According to Second Embodiment]

Figure 7:
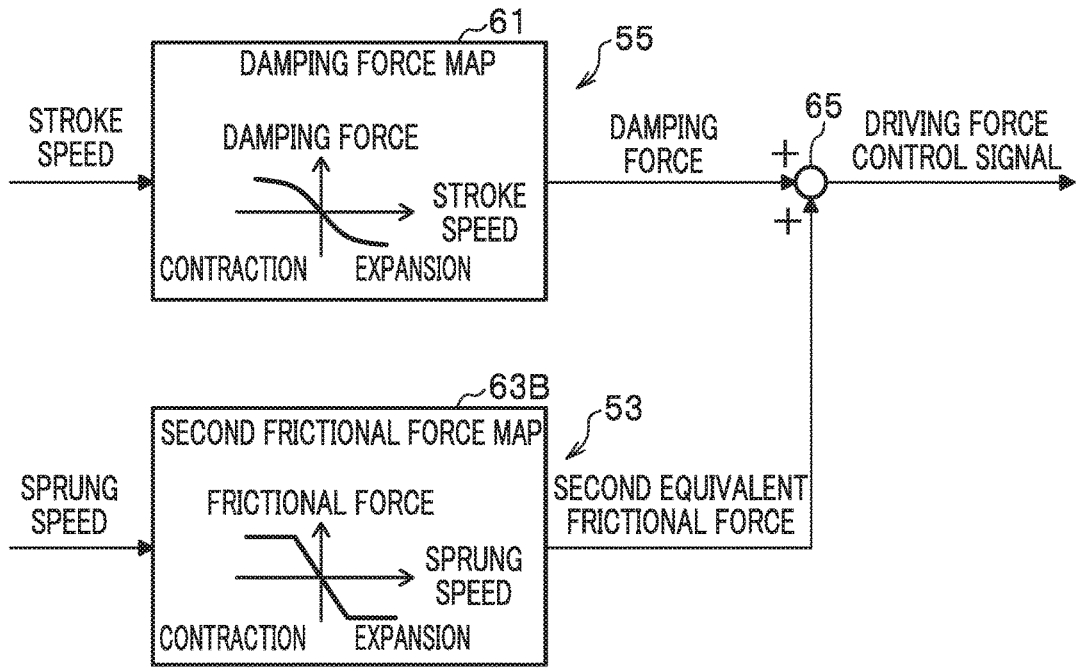
FIG. 7 is a block configuration diagram of an equivalent frictional force calculation unit, a driving force calculation unit, and their surroundings of the ECU provided in the electromagnetic suspension apparatus according to a second embodiment.

Next, the block configuration of the equivalent frictional force calculation unit 53, the driving force calculation unit 55, and their surroundings according to the second embodiment will be described with reference to FIG. 7. FIG. 7 is a block configuration diagram of the equivalent frictional force calculation unit 53, the driving force calculation unit 55, and their surroundings according to the second embodiment.

Here, the equivalent frictional force calculation unit 53 according to the first embodiment and the equivalent frictional force calculation unit 53 according to the second embodiment have many constituent elements common to both. Therefore, the equivalent frictional force calculation unit 53 according to the second embodiment will be described by focusing on different components between them. Note that the driving force calculation unit 55 according to the first embodiment and the driving force calculation unit 55 according to the second embodiment have mutually common configurations.

As shown in FIG. 7, the equivalent frictional force calculation unit 53 according to the second embodiment is configured to include a second frictional force map 63B instead of the first frictional force map 63A of the equivalent frictional force calculation unit 53 according to the first embodiment.

As shown in FIG. 7, a value of the equivalent frictional force which changes in association with the change in the sprung speed is stored in the second frictional force map 63B of the equivalent frictional force calculation unit 53 according to the second embodiment. The second frictional force map 63B is referred to when applying the frictional force equivalent to the mechanical frictional force (force in the direction opposite to the direction of the stroke speed) using the driving force of the electromagnetic actuator 13. In the example shown in FIG. 7, in a small sprung speed range where an absolute value of the sprung speed is not more than a predetermined value, the equivalent frictional force directed to the contraction side linearly increases as the sprung speed increases toward the expansion side, while the equivalent frictional force directed to the expansion side linearly increases as the sprung speed increases toward the contraction side. When the sprung speed is zero, the value of the equivalent frictional force corresponding to the stroke speed is also zero. Further, in a non-small sprung speed range where the absolute value of the sprung speed exceeds a predetermined value, the equivalent frictional force directed to the contraction side converges to a predetermined value irrespective of a magnitude of the sprung speed directed to the expansion side, while the equivalent frictional force directed to the expansion side converges to a predetermined value irrespective of a magnitude of the sprung speed directed to the contraction side. The predetermined values of the equivalent frictional force corresponding to the sprung speed are set to appropriate values through experiments and simulations in consideration of a magnitude of the frictional force related to the electromagnetic actuator 13, which varies according to the change in the sprung speed.

The equivalent frictional force calculation unit 53 according to the second embodiment calculates a value of a second frictional force corresponding to the sprung speed with reference to the sprung speed acquired by the information acquisition unit 51 and the stored contents of the second friction force map 63B. The value of the second equivalent frictional force calculated in this way is sent to the adder 65.

The adder 65 of the driving force calculation unit 55 according to the second embodiment adds the value of the second equivalent frictional force based on the sprung speed calculated with reference to the second frictional force map 63B to the value of the damping force calculated with reference to the damping force map 61, and thus generates the driving force control signal including the target driving force obtained by integrating the damping force and the second equivalent frictional force. The driving force control signal including the target driving force generated in this way is sent to the drive control unit 57. In response to this, the drive control unit 57 controls driving of the plurality of electromagnetic actuators 13.

[Operation of Electromagnetic Suspension Apparatus 11 According to Second Embodiment]

Next, an operation of the electromagnetic suspension apparatus 11 according to the second embodiment of the present invention will be described with reference to FIG. 5.

In Step S11 (various information acquisition) shown in FIG. 5, the information acquisition unit 51 of the ECU 15 acquires information on the stroke position of the electromagnetic actuator 13 and the sprung acceleration detected by the sprung acceleration sensor 41.

In Step S12 (stroke speed calculation), the information acquisition unit 51 of the ECU 15 calculates (acquires) information on the time-series signal of the stroke speed by time-differentiating the information on the stroke position acquired in Step S11. Further, the information acquisition unit 51 of the ECU 15 acquires information on the time-series signal of the sprung speed by time-integrating the information on the sprung acceleration acquired in Step S11. The information on the time-series signal of the sprung speed acquired by the information acquisition unit 51 is sent to the equivalent frictional force calculation unit 53.

In Step S13 (equivalent frictional force calculation), the equivalent frictional force calculation unit 53 of the ECU 15 inputs the information on the time-series signal of the sprung speed acquired in Step S12, and calculates the value of the equivalent frictional force corresponding to the sprung speed with reference to this information and the second frictional force map 63B. The information on the equivalent frictional force calculated in this way is sent to the driving force calculation unit 55.

In Step S14 (driving force calculation process), the driving force calculation unit 55 of the ECU 15 inputs the information on the time-series signal of the stroke speed acquired in Step S12, and performs the driving force calculation process with reference to this information, the damping force map 61, and the value of the second equivalent frictional force corresponding to the sprung speed calculated in Step S13, and thus calculates the driving force control signal including the target driving force.

More specifically, the driving force calculation unit 55 according to the second embodiment calculates the value of the damping force corresponding to the stroke speed with reference to the information on the time-series signal of the stroke speed and the stored contents (damping force changing in association with the change in the stroke speed) of the damping force map 61. Next, the adder 65 of the driving force calculation unit 55 according to the second embodiment adds the value of the second equivalent frictional force corresponding to the sprung speed calculated in Step S13 to the value of the damping force calculated with reference to the damping force map 61, and thus generates the driving force control signal including the target driving force obtained by integrating the damping force and the second equivalent frictional force.

In Step S15, the drive control unit 57 of the ECU 15 supplies the drive control power to the electric motor 31 provided in each of the plurality of electromagnetic actuators 13 in accordance with the driving force control signal obtained by the calculation in Step S14, and thus controls driving of the plurality of electromagnetic actuators 13.

In the electromagnetic suspension apparatus 11 according to the second embodiment, the damping force corresponding to the stroke speed is calculated with reference to the damping force map 61, while the second equivalent frictional force corresponding to the sprung speed is calculated with reference to the second frictional force map 63B, and the electromagnetic actuator 13 is controlled to be driven using the target drive force obtained by integrating the damping force and the second equivalent frictional force calculated in this way.

With the electromagnetic suspension apparatus 11 according to the second embodiment, the value of the second equivalent frictional force equivalent to the mechanical frictional force generated at each part of the electromagnetic actuator 13 due to the sprung speed is calculated, and the target driving force is corrected by adding the value of the second equivalent frictional force thus calculated to the value of the damping force, and thus it is possible to quickly damp the vibration of the vehicle by the equivalent frictional force.

Here, when the target driving force is corrected by adding the value of the first equivalent frictional force corresponding to the stroke speed to the value of the damping force as in the electromagnetic suspension apparatus 11 according to the first embodiment, the vibration damping effect in the sprung member and the vibration damping effect in the unsprung member can be obtained in the small stroke speed range, while there remains a problem that these two cannot be individually adjusted.

Therefore, in the electromagnetic suspension apparatus 11 according to the second embodiment, it is configured such that the target driving force is corrected by adding the value of the second equivalent frictional force corresponding to the sprung speed to the value of the damping force. With the electromagnetic suspension apparatus 11 according to the second embodiment, since the target driving force is corrected by adding the value of the second equivalent frictional force calculated based on the sprung speed to the value of the damping force, it is possible to obtain an effect of preferentially damping vibration of the sprung member while preventing interference with vibration of the unsprung member, thereby contributing to improvement of the ride comfort.

[Block Configuration of Equivalent Frictional Force Calculation Unit 53, Driving Force Calculation Unit 55, and their Surroundings According to Third Embodiment]

Figure 8:
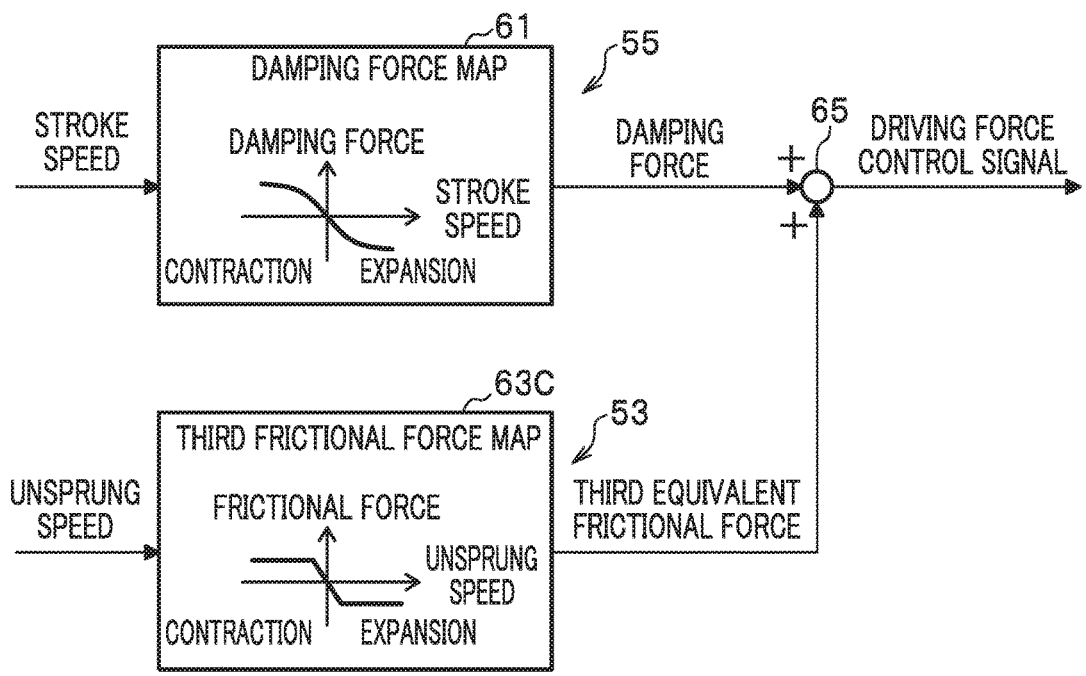
FIG. 8 is a block configuration diagram of an equivalent frictional force calculation unit, a driving force calculation unit, and their surroundings of the ECU provided in the electromagnetic suspension apparatus according to a third embodiment.

Next, the block configuration of the equivalent frictional force calculation unit 53, the driving force calculation unit 55, and their surroundings according to the third embodiment will be described with reference to FIG. 8. FIG. 8 is a block configuration diagram of the equivalent frictional force calculation unit 53, the driving force calculation unit 55, and their surroundings according to the third embodiment.

Here, the equivalent frictional force calculation unit 53 according to the first embodiment and the equivalent frictional force calculation unit 53 according to the third embodiment have many constituent elements common to both. Therefore, the equivalent frictional force calculation unit 53 according to the third embodiment will be described by focusing on different components between them. Note that the driving force calculation unit 55 according to the first embodiment and the driving force calculation unit 55 according to the third embodiment have constituent elements common to both.

As shown in FIG. 8, the equivalent frictional force calculation unit 53 according to the third embodiment is configured to include a third frictional force map 63C instead of the first frictional force map 63A of the equivalent frictional force calculation unit 53 according to the first embodiment.

As shown in FIG. 8, a value of the equivalent frictional force which changes in association with the change in the unsprung speed is stored in the third frictional force map 63C of the equivalent frictional force calculation unit 53 according to the third embodiment. The third frictional force map 63C is referred to when applying the frictional force equivalent to the mechanical frictional force (force in the direction opposite to the direction of the stroke speed) using the driving force of the electromagnetic actuator 13. In the example shown in FIG. 8, in a small unsprung speed range where an absolute value of the unsprung speed is not more than a predetermined value, the equivalent frictional force directed to the contraction side linearly increases as the unsprung speed increases toward the expansion side, while the equivalent frictional force directed to the expansion side linearly increases as the unsprung speed increases toward the contraction side. When the unsprung speed is zero, the value of the equivalent frictional force corresponding to the stroke speed is also zero. Further, in a non-small unsprung speed range where the absolute value of the unsprung speed exceeds a predetermined value, the equivalent frictional force directed to the contraction side converges to a predetermined value irrespective of a magnitude of the unsprung speed directed to the expansion side, while the equivalent frictional force directed to the expansion side converges to a predetermined value irrespective of a magnitude of the unsprung speed directed to the contraction side. The predetermined values of the third equivalent frictional force corresponding to the unsprung speed are set to appropriate values through experiments and simulations in consideration of a magnitude of the frictional force related to the electromagnetic actuator 13, which varies according to the change in the unsprung speed.

The equivalent frictional force calculation unit 53 according to the third embodiment calculates a value of a third frictional force corresponding to the unsprung speed with reference to the unsprung speed acquired by the information acquisition unit 51 and the stored contents of the third friction force map 63C. The value of the third equivalent frictional force calculated in this way is sent to the adder 65.

The adder 65 of the driving force calculation unit 55 according to the third embodiment adds the value of the equivalent frictional force based on the unsprung speed calculated with reference to the third frictional force map 63C to the value of the damping force calculated with reference to the damping force map 61, and thus generates the driving force control signal including the target driving force obtained by integrating the damping force and the equivalent frictional force. The driving force control signal including the target driving force generated in this way is sent to the drive control unit 57. In response to this, the drive control unit 57 controls driving of the plurality of electromagnetic actuators 13.

[Operation of Electromagnetic Suspension Apparatus 11 According to Third Embodiment]

Next, the operation of the electromagnetic suspension apparatus 11 according to the third embodiment of the present invention will be described with reference to FIG. 5.

In Step S11 (various information acquisition) shown in FIG. 5, the information acquisition unit 51 of the ECU 15 acquires information on the stroke position of the electromagnetic actuator 13 and the unsprung acceleration detected by the unsprung acceleration sensor 42.

In Step S12 (stroke speed calculation), the information acquisition unit 51 of the ECU 15 calculates (acquires) information on the time-series signal of the stroke speed by time-differentiating the information on the stroke position acquired in Step S11. Further, the information acquisition unit 51 of the ECU 15 acquires information on the time-series signal of the unsprung speed by time-integrating the information on the unsprung acceleration acquired in Step S11. The information on the time-series signal of the unsprung speed acquired by the information acquisition unit 51 is sent to the equivalent frictional force calculation unit 53.

In Step S13 (equivalent frictional force calculation), the equivalent frictional force calculation unit 53 of the ECU 15 inputs the information on the time-series signal of the unsprung speed acquired in Step S12, and calculates the value of the third equivalent frictional force corresponding to the unsprung speed with reference to this information and the third frictional force map 63C. The information on the third equivalent frictional force calculated in this way is sent to the driving force calculation unit 55.

In Step S14 (driving force calculation process), the driving force calculation unit 55 of the ECU 15 inputs the information on the time-series signal of the stroke speed acquired in Step S12, and performs the driving force calculation process with reference to this information, the damping force map 61, and the value of the third equivalent frictional force corresponding to the unsprung speed calculated in Step S13, and thus calculates the driving force control signal including the target driving force.

More specifically, the driving force calculation unit 55 according to the third embodiment calculates the value of the damping force corresponding to the stroke speed with reference to the information on the time-series signal of the stroke speed and the stored contents (damping force changing in association with the change in the stroke speed) of the damping force map 61. Next, the adder 65 of the driving force calculation unit 55 according to the third embodiment adds the value of the third equivalent frictional force corresponding to the unsprung speed calculated in Step S13 to the value of the damping force calculated with reference to the damping force map 61, and thus generates the driving force control signal including the target driving force obtained by integrating the damping force and the third equivalent frictional force.

In Step S15, the drive control unit 57 of the ECU 15 supplies the drive control power to the electric motor 31 provided in each of the plurality of electromagnetic actuators 13 in accordance with the driving force control signal obtained by the calculation in Step S14, and thus controls driving of the plurality of electromagnetic actuators 13.

In the electromagnetic suspension apparatus 11 according to the third embodiment, the damping force corresponding to the stroke speed is calculated with reference to the damping force map 61, while the third equivalent frictional force corresponding to the unsprung speed is calculated with reference to the third frictional force map 63C, and the electromagnetic actuator 13 is controlled to be driven using the target drive force obtained by integrating the damping force and the third equivalent frictional force calculated in this way.

With the electromagnetic suspension apparatus 11 according to the third embodiment, the value of the third equivalent frictional force equivalent to the mechanical frictional force generated at each part of the electromagnetic actuator 13 due to the unsprung speed is calculated, and the target driving force is corrected by adding the value of the third equivalent frictional force thus calculated to the value of the damping force, and thus it is possible to quickly damp the vibration of the vehicle by the equivalent frictional force.

Here, when the target driving force is corrected by adding the value of the equivalent frictional force corresponding to the stroke speed to the value of the damping force as in the electromagnetic suspension apparatus 11 according to the first embodiment, the vibration damping effect in the sprung member and the vibration damping effect in the unsprung member can be obtained in the small stroke speed range, while there remains a problem that these two cannot be individually adjusted.

Therefore, in the electromagnetic suspension apparatus 11 according to the third embodiment, it is configured such that the target driving force is corrected by adding the value of the third equivalent frictional force corresponding to the unsprung speed to the value of the damping force. With the electromagnetic suspension apparatus 11 according to the third embodiment, since the target driving force is corrected by adding the value of the third equivalent frictional force calculated based on the unsprung speed to the value of the damping force, it is possible to obtain an effect of preferentially damping vibration of the unsprung member while preventing interference with vibration of the sprung member, thereby contributing to improvement of road holding performance.

[Block Configuration of Equivalent Frictional Force Calculation Unit 53, Driving Force Calculation Unit 55, and their Surroundings According to Fourth Embodiment]

Figure 9:
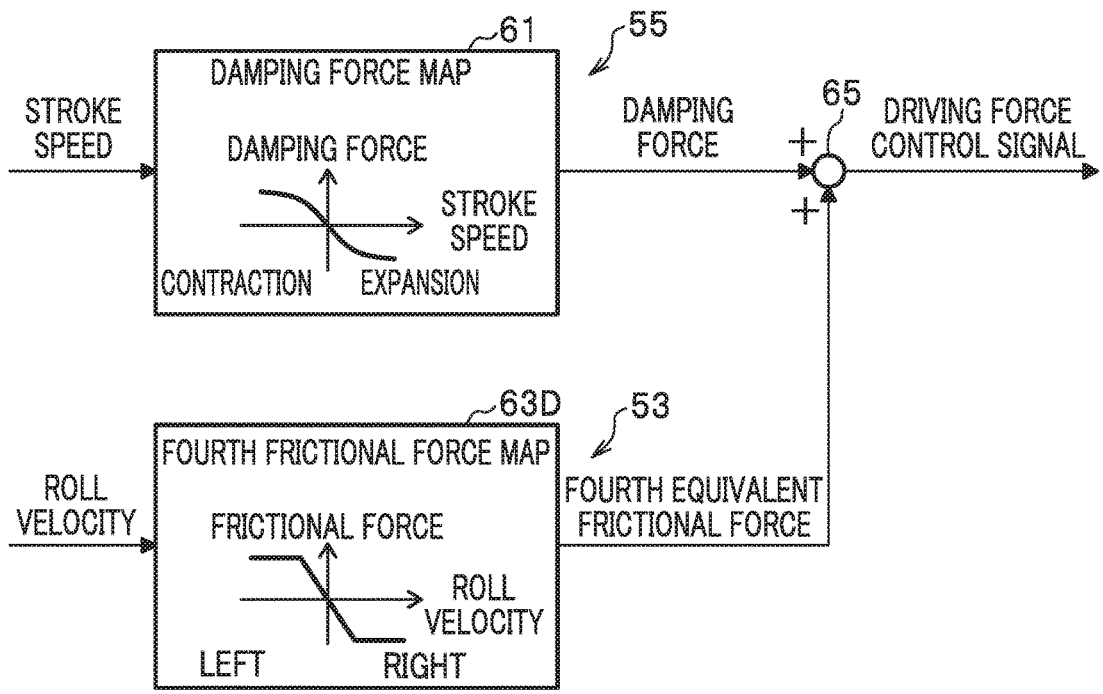
FIG. 9 is a block configuration diagram of an equivalent frictional force calculation unit, a driving force calculation unit, and their surroundings of the ECU provided in the electromagnetic suspension apparatus according to a fourth embodiment.

Next, the block configuration of the equivalent frictional force calculation unit 53, the driving force calculation unit 55, and their surroundings according to the fourth embodiment will be described with reference to FIG. 9. FIG. 9 is a block configuration diagram of the equivalent frictional force calculation unit 53, the driving force calculation unit 55, and their surroundings according to the fourth embodiment.

Here, the equivalent frictional force calculation unit 53 according to the first embodiment and the equivalent frictional force calculation unit 53 according to the fourth embodiment have many constituent elements common to both. Therefore, the equivalent frictional force calculation unit 53 according to the fourth embodiment will be described by focusing on different components between them. Note that the driving force calculation unit 55 according to the first embodiment and the driving force calculation unit 55 according to the fourth embodiment have mutually common configurations.

As shown in FIG. 9, the equivalent frictional force calculation unit 53 according to the fourth embodiment is configured to include a fourth frictional force map 63D instead of the first frictional force map 63A of the equivalent frictional force calculation unit 53 according to the first embodiment.

As shown in FIG. 9, a value of the equivalent frictional force which changes in association with the change in the roll velocity is stored in the fourth frictional force map 63D of the equivalent frictional force calculation unit 53 according to the fourth embodiment. The fourth frictional force map 63D is referred to when applying the frictional force equivalent to the mechanical frictional force (force in the direction opposite to the direction of the stroke speed) using the driving force of the electromagnetic actuator 13. In the example shown in FIG. 9, in a small roll velocity range where an absolute value of the roll velocity is not more than a predetermined value, the equivalent frictional force directed to the contraction side linearly increases as the roll velocity increases toward the expansion side, while the equivalent frictional force directed to the expansion side linearly increases as the roll velocity increases toward the contraction side. When the roll velocity is zero, the value of the equivalent frictional force corresponding to the stroke speed is also zero. Further, in a non-small roll velocity range where the absolute value of the roll velocity exceeds a predetermined value, the equivalent frictional force directed to the contraction side converges to a predetermined value irrespective of a magnitude of the roll velocity directed to the expansion side, while the equivalent frictional force directed to the expansion side converges to a predetermined value irrespective of a magnitude of the roll velocity directed to the contraction side. The predetermined values of the equivalent frictional force corresponding to the roll velocity are set to appropriate values through experiments and simulations in consideration of a magnitude of the frictional force related to the electromagnetic actuator 13, which varies according to the change in the roll velocity.

The equivalent frictional force calculation unit 53 according to the fourth embodiment calculates a value of a fourth equivalent frictional force corresponding to the roll velocity with reference to the roll velocity acquired by the information acquisition unit 51 and the stored contents of the fourth friction force map 63D. The value of the fourth equivalent frictional force calculated in this way is sent to the adder 65.

The adder 65 of the driving force calculation unit 55 according to the fourth embodiment adds the value of the fourth equivalent frictional force based on the roll velocity calculated with reference to the fourth frictional force map 63D to the value of the damping force calculated with reference to the damping force map 61, and thus generates the driving force control signal including the target driving force obtained by integrating the damping force and the fourth equivalent frictional force. The driving force control signal including the target driving force generated in this way is sent to the drive control unit 57. In response to this, the drive control unit 57 controls driving of the plurality of electromagnetic actuators 13.

[Operation of Electromagnetic Suspension Apparatus 11 According to Fourth Embodiment]

Next, the operation of the electromagnetic suspension apparatus 11 according to the fourth embodiment of the present invention will be described with reference to FIG. 5.

In Step S11 (various information acquisition) shown in FIG. 5, the information acquisition unit 51 of the ECU 15 acquires information on the stroke position of the electromagnetic actuator 13 and the roll velocity detected by the roll velocity sensor 43. Information on a time-series signal of the roll velocity acquired by the information acquisition unit 51 is sent to the equivalent frictional force calculation unit 53.

In Step S12 (stroke speed calculation), the information acquisition unit 51 of the ECU 15 acquires information on the time-series signal of the stroke speed by time-differentiating the information on the stroke position acquired in Step S11. The information on the time-series signal of the stroke speed acquired by the information acquisition unit 51 is sent to the driving force calculation unit 55.

In Step S13 (equivalent frictional force calculation), the equivalent frictional force calculation unit 53 of the ECU 15 inputs the information on the time-series signal of the roll velocity acquired in Step S11, and calculates the value of the fourth equivalent frictional force corresponding to the roll velocity with reference to this information and the fourth frictional force map 63D. The information on the fourth equivalent frictional force calculated in this way is sent to the driving force calculation unit 55.

In Step S14 (driving force calculation process), the driving force calculation unit 55 of the ECU 15 inputs the information on the time-series signal of the stroke speed acquired in Step S12, and performs the driving force calculation process with reference to this information, the damping force map 61, and the value of the fourth equivalent frictional force corresponding to the roll velocity calculated in Step S13, and thus calculates the driving force control signal including the target driving force.

More specifically, the driving force calculation unit 55 according to the fourth embodiment calculates the value of the damping force corresponding to the stroke speed with reference to the information on the time-series signal of the stroke speed and the stored contents (damping force changing in association with the change in the stroke speed) of the damping force map 61. Next, the adder 65 of the driving force calculation unit 55 according to the fourth embodiment adds the value of the fourth equivalent frictional force corresponding to the roll velocity calculated in Step S13 to the value of the damping force calculated with reference to the damping force map 61, and thus generates the driving force control signal including the target driving force obtained by integrating the damping force and the fourth equivalent frictional force.

In Step S15, the drive control unit 57 of the ECU 15 supplies the drive control power to the electric motor 31 provided in each of the plurality of electromagnetic actuators 13 in accordance with the driving force control signal obtained by the calculation in Step S14, and thus controls driving of the plurality of electromagnetic actuators 13.

In the electromagnetic suspension apparatus 11 according to the fourth embodiment, the damping force corresponding to the stroke speed is calculated with reference to the damping force map 61, while the fourth equivalent frictional force corresponding to the roll velocity is calculated with reference to the fourth frictional force map 63D, and the electromagnetic actuator 13 is controlled to be driven using the target drive force obtained by integrating the damping force and the fourth equivalent frictional force calculated in this way.

With the electromagnetic suspension apparatus 11 according to the fourth embodiment, the value of the fourth equivalent frictional force equivalent to the mechanical frictional force generated at each part of the electromagnetic actuator 13 due to the roll velocity is calculated, and the target driving force is corrected by adding the value of the fourth equivalent frictional force thus calculated to the value of the damping force, and thus it is possible to quickly damp the vibration of the vehicle by the equivalent frictional force.

Here, when the target driving force is corrected by adding the value of the first equivalent frictional force corresponding to the stroke speed to the value of the damping force as in the electromagnetic suspension apparatus 11 according to the first embodiment, the vibration damping effect in an up-down direction of the sprung member and the unsprung member and the vibration damping effect in a rolling direction can be obtained in the small stroke speed range, while there remains a problem that these two cannot be individually adjusted.

Therefore, in the electromagnetic suspension apparatus 11 according to the fourth embodiment, it is configured such that the target driving force is corrected by adding the value of the equivalent frictional force corresponding to the roll velocity to the value of the damping force. With the electromagnetic suspension apparatus 11 according to the fourth embodiment, since the target driving force is corrected by adding the value of the fourth equivalent frictional force calculated based on the roll velocity to the value of the damping force, it is possible to obtain an effect of preferentially damping vibration in the rolling direction while preventing interference with vibration in the up-down direction of the sprung member and the unsprung member, thereby contributing to improvement of roll preventing performance.

[Block Configuration of Equivalent Frictional Force Calculation Unit 53, Driving Force Calculation Unit 55, and their Surroundings According to Fifth Embodiment]

Figure 10:
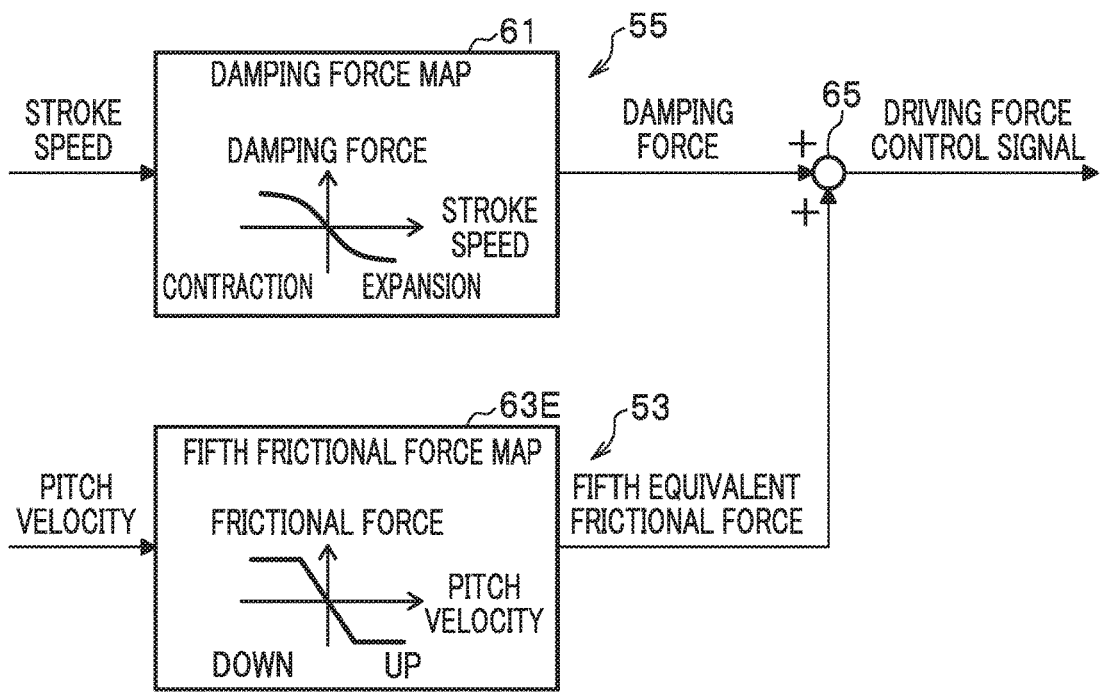
FIG. 10 is a block configuration diagram of an equivalent frictional force calculation unit, a driving force calculation unit, and their surroundings of the ECU provided in the electromagnetic suspension apparatus according to a fifth embodiment.

Next, the block configuration of the equivalent frictional force calculation unit 53, the driving force calculation unit 55, and their surroundings according to the fifth embodiment will be described with reference to FIG. 10. FIG. 10 is a block configuration diagram of the equivalent frictional force calculation unit 53, the driving force calculation unit 55, and their surroundings according to the fifth embodiment.

Here, the equivalent frictional force calculation unit 53 according to the first embodiment and the equivalent frictional force calculation unit 53 according to the fifth embodiment have many constituent elements common to both. Therefore, the equivalent frictional force calculation unit 53 according to the fifth embodiment will be described by focusing on different components between them. Note that the driving force calculation unit 55 according to the first embodiment and the driving force calculation unit 55 according to the fifth embodiment have mutually common configurations.

As shown in FIG. 10, the equivalent frictional force calculation unit 53 according to the fifth embodiment is configured to include a fifth frictional force map 63E instead of the first frictional force map 63A of the equivalent frictional force calculation unit 53 according to the first embodiment.

As shown in FIG. 10, a value of the equivalent frictional force which changes in association with the change in the pitch velocity is stored in the fifth frictional force map 63E of the equivalent frictional force calculation unit 53 according to the fifth embodiment. The fifth frictional force map 63E is referred to when applying the frictional force equivalent to the mechanical frictional force (force in the direction opposite to the direction of the stroke speed) using the driving force of the electromagnetic actuator 13. In the example shown in FIG. 10, in a small pitch velocity range where an absolute value of the pitch velocity is not more than a predetermined value, the equivalent frictional force directed to the contraction side linearly increases as the pitch velocity increases toward the expansion side, while the equivalent frictional force directed to the expansion side linearly increases as the pitch velocity increases toward the contraction side. When the pitch velocity is zero, the value of the equivalent frictional force corresponding to the stroke speed is also zero. Further, in a non-small pitch velocity range where the absolute value of the pitch velocity exceeds a predetermined value, the equivalent frictional force directed to the contraction side converges to a predetermined value irrespective of a magnitude of the pitch velocity directed to the expansion side, while the equivalent frictional force directed to the expansion side converges to a predetermined value irrespective of a magnitude of the pitch velocity directed to the contraction side. The predetermined values of the equivalent frictional force corresponding to the pitch velocity are set to appropriate values through experiments and simulations in consideration of a magnitude of the frictional force related to the electromagnetic actuator 13, which varies according to the change in the pitch velocity.

The equivalent frictional force calculation unit 53 according to the fifth embodiment calculates a value of a fifth equivalent frictional force corresponding to the pitch velocity with reference to the pitch velocity acquired by the information acquisition unit 51 and the stored contents of the fifth friction force map 63E. The value of the fifth equivalent frictional force calculated in this way is sent to the adder 65.

The adder 65 of the driving force calculation unit 55 according to the fifth embodiment adds the value of the fifth equivalent frictional force based on the pitch velocity calculated with reference to the fifth frictional force map 63E to the value of the damping force calculated with reference to the damping force map 61, and thus generates the driving force control signal including the target driving force obtained by integrating the damping force and the fifth equivalent frictional force. The driving force control signal including the target driving force generated in this way is sent to the drive control unit 57. In response to this, the drive control unit 57 controls driving of the plurality of electromagnetic actuators 13.

[Operation of Electromagnetic Suspension Apparatus 11 According to Fifth Embodiment]

Next, the operation of the electromagnetic suspension apparatus 11 according to the fifth embodiment of the present invention will be described with reference to FIG. 5.

In Step S11 (various information acquisition) shown in FIG. 5, the information acquisition unit 51 of the ECU 15 acquires information on the stroke position of the electromagnetic actuator 13 and the pitch velocity detected by the pitch velocity sensor 44. Information on a time-series signal of the pitch velocity acquired by the information acquisition unit 51 is sent to the equivalent frictional force calculation unit 53.

In Step S12 (stroke speed calculation), the information acquisition unit 51 of the ECU 15 calculates (acquires) information on the time-series signal of the stroke speed by time-differentiating the information on the stroke position acquired in Step S11. The information on the time-series signal of the stroke speed acquired by the information acquisition unit 51 is sent to the driving force calculation unit 55.

In Step S13 (equivalent frictional force calculation), the equivalent frictional force calculation unit 53 of the ECU 15 inputs the information on the time-series signal of the pitch velocity acquired in Step S11, and calculates the value of the fifth equivalent frictional force corresponding to the pitch velocity with reference to this information and the fifth frictional force map 63E. The information on the fifth equivalent frictional force calculated in this way is sent to the driving force calculation unit 55.

In Step S14 (driving force calculation process), the driving force calculation unit 55 of the ECU 15 inputs the information on the time-series signal of the stroke speed acquired in Step S12, and performs the driving force calculation process with reference to this information, the damping force map 61, and the value of the fifth equivalent frictional force corresponding to the pitch velocity calculated in Step S13, and thus calculates the driving force control signal including the target driving force.

More specifically, the driving force calculation unit 55 according to the fifth embodiment calculates the value of the damping force corresponding to the stroke speed with reference to the information on the time-series signal of the stroke speed and the stored contents (damping force changing in association with the change in the stroke speed) of the damping force map 61. Next, the adder 65 of the driving force calculation unit 55 according to the fifth embodiment adds the value of the fifth equivalent frictional force corresponding to the pitch velocity calculated in Step S13 to the value of the damping force calculated with reference to the damping force map 61, and thus generates the driving force control signal including the target driving force obtained by integrating the damping force and the fifth equivalent frictional force.

In Step S15, the drive control unit 57 of the ECU 15 supplies the drive control power to the electric motor 31 provided in each of the plurality of electromagnetic actuators 13 in accordance with the driving force control signal obtained by the calculation in Step S14, and thus controls driving of the plurality of electromagnetic actuators 13.

In the electromagnetic suspension apparatus 11 according to the fifth embodiment, the damping force corresponding to the stroke speed is calculated with reference to the damping force map 61, while the fifth equivalent frictional force corresponding to the pitch velocity is calculated with reference to the fifth frictional force map 63E, and the electromagnetic actuator 13 is controlled to be driven using the target drive force obtained by integrating the damping force and the fifth equivalent frictional force calculated in this way.

With the electromagnetic suspension apparatus 11 according to the fifth embodiment, the value of the fifth equivalent frictional force equivalent to the mechanical frictional force generated at each part of the electromagnetic actuator 13 due to the pitch velocity is calculated, and the target driving force is corrected by adding the value of the fifth equivalent frictional force thus calculated to the value of the damping force, and thus it is possible to quickly damp the vibration of the vehicle by the equivalent frictional force.

Here, when the target driving force is corrected by adding the value of the first equivalent frictional force corresponding to the stroke speed to the value of the damping force as in the electromagnetic suspension apparatus 11 according to the first embodiment, the vibration damping effect in an up-down direction of the sprung member and the unsprung member and the vibration damping effect in a pitch direction can be obtained in the small stroke speed range, while there remains a problem that these two cannot be individually adjusted.

Therefore, in the electromagnetic suspension apparatus 11 according to the fifth embodiment, it is configured such that the target driving force is corrected by adding the value of the fifth equivalent frictional force corresponding to the pitch velocity to the value of the damping force. With the electromagnetic suspension apparatus 11 according to the fifth embodiment, since the target driving force is corrected by adding the value of the fifth equivalent frictional force calculated based on the pitch velocity to the value of the damping force, it is possible to obtain an effect of preferentially damping vibration in the pitch direction while preventing interference with the vibration in the up-down direction of the sprung member and the unsprung member, thereby contributing to improvement of pitch preventing performance.

[Block Configuration of Equivalent Frictional Force Calculation Unit 53, Driving Force Calculation Unit 55, and their Surroundings According to Sixth Embodiment]

Figure 11:
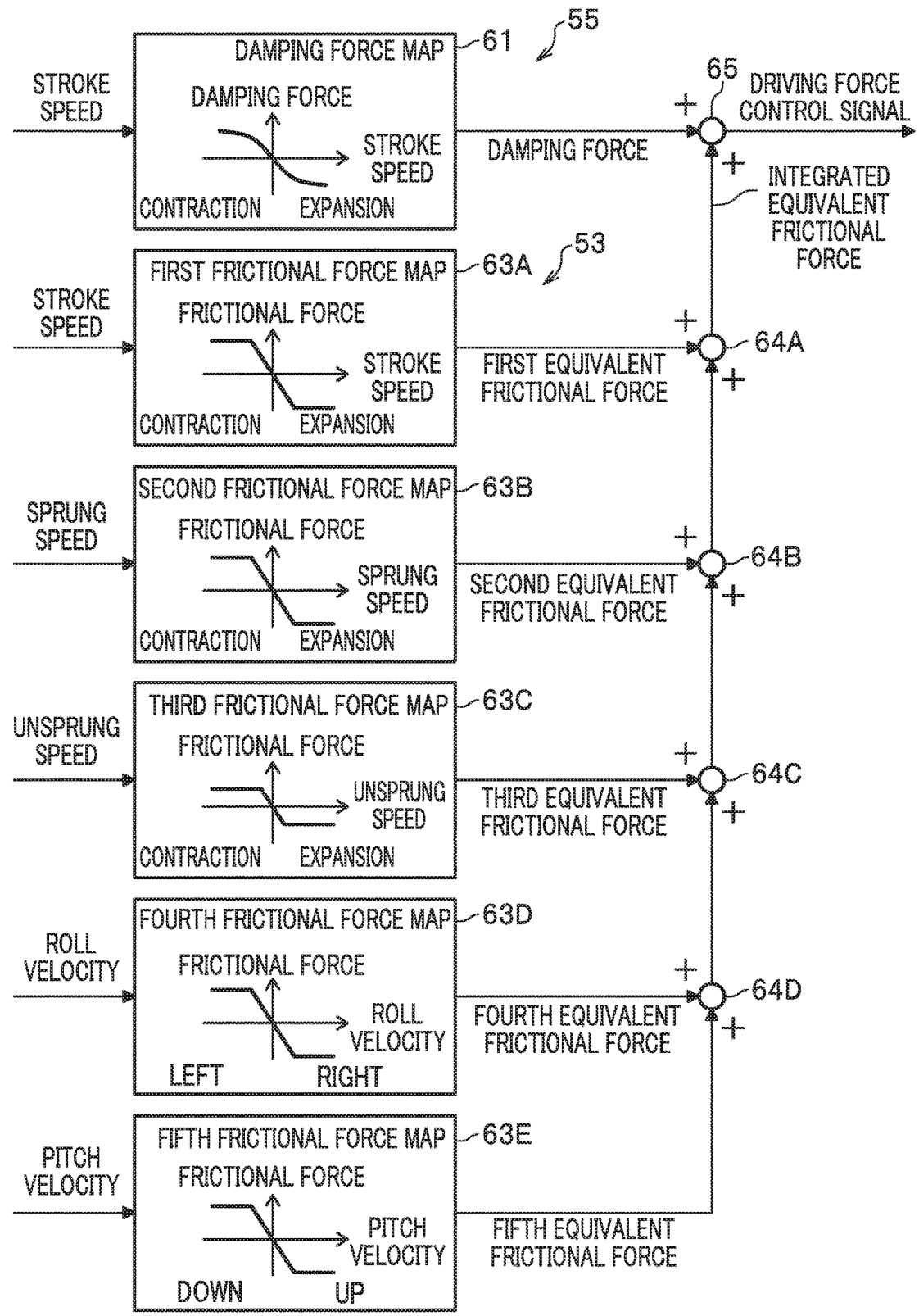
FIG. 11 is a block configuration diagram of an equivalent frictional force calculation unit, a driving force calculation unit, and their surroundings of the ECU provided in the electromagnetic suspension apparatus according to a sixth embodiment.

Next, the block configuration of the equivalent frictional force calculation unit 53, the driving force calculation unit 55, and their surroundings according to a sixth embodiment will be described with reference to FIG. 11. FIG. 11 is a block configuration diagram of the equivalent frictional force calculation unit 53, the driving force calculation unit 55, and their surroundings according to the sixth embodiment.

Here, the equivalent frictional force calculation unit 53 according to the first to fifth embodiments and the equivalent frictional force calculation unit 53 according to the sixth embodiment have many constituent elements common to both. Therefore, the equivalent frictional force calculation unit 53 according to the sixth embodiment will be described by focusing on different components between them.

As shown in FIG. 11, the equivalent frictional force calculation unit 53 according to the sixth embodiment is configured to include all of the first to fifth frictional force maps 63A, 63B, 63C, 63D, 63E included in the equivalent frictional force calculation unit 53 according to the first to fifth embodiments. Duplicated description of the first to fifth frictional force maps 63A, 63B, 63C, 63D, 63E will be omitted.

The equivalent frictional force calculation unit 53 according to the sixth embodiment calculates the values of the first to fifth equivalent frictional forces respectively corresponding to the stroke speed, the sprung speed, the unsprung speed, the roll velocity, and the pitch velocity, with reference to the vehicle state information including the stroke speed of the electromagnetic actuator 13, the sprung speed, the unsprung speed, the roll velocity, and the pitch velocity acquired by the information acquisition unit 51, and the stored contents of the first to fifth friction force maps 63A, 63B, 63C, 63D, 63E. The first to fifth equivalent frictional forces thus calculated are sent to the adder 65 via the first to fourth adders 64A, 64B, 64C, 64D.

The adder 65 of the driving force calculation unit 55 according to the sixth embodiment adds the first to fifth equivalent frictional forces based on the stroke speed, the sprung speed, the unsprung speed, the roll velocity, and the pitch velocity, which have been respectively calculated with reference to the first to fifth friction force maps 63A, 63B, 63C, 63D, 63E, to the value of the damping force obtained with reference to the damping force map 61, and thus generates the driving force control signal including the target driving force obtained by integrating the damping force and the first to fifth frictional forces. The driving force control signal including the target driving force thus generated is sent to the drive control unit 57. In response to this, the drive control unit 57 controls driving of the plurality of electromagnetic actuators 13.

[Operation of Electromagnetic Suspension Apparatus 11 According to Sixth Embodiment]

Next, the operation of the electromagnetic suspension apparatus 11 according to the sixth embodiment of the present invention will be described with reference to FIG. 5.

In Step S11 (various information acquisition) shown in FIG. 5, the information acquisition unit 51 of the ECU 15 acquires information on the stroke position of the electromagnetic actuator 13, the sprung acceleration detected by the sprung acceleration sensor 41, the unsprung acceleration detected by the unsprung acceleration sensor 42, the roll velocity detected by the roll velocity sensor 43, and the pitch velocity detected by the pitch velocity sensor 44. Information on time-series signals of the roll velocity and the pitch velocity acquired by the information acquisition unit 51 is sent to the equivalent frictional force calculation unit 53.

In Step S12 (stroke speed calculation), the information acquisition unit 51 of the ECU 15 acquires information on the time-series signal of the stroke speed by time-differentiating the information on the stroke position acquired in Step S11. The information on the time-series signal of the stroke speed acquired by the information acquisition unit 51 is sent to the driving force calculation unit 55. Further, the information acquisition unit 51 of the ECU 15 acquires information on the time-series signals of the sprung speed and the unsprung speed by respectively time-integrating the information on the sprung acceleration and the unsprung acceleration acquired in Step S11. Information on the time-series signals of the sprung speed and the unsprung speed acquired by the information acquisition unit 51 is sent to the equivalent frictional force calculation unit 53.

In Step S13 (equivalent frictional force calculation), the equivalent frictional force calculation unit 53 of the ECU 15 inputs the information on the time-series signals of the stroke speed of the electromagnetic actuator 13, the sprung speed, the unsprung speed, the roll velocity, and the pitch velocity acquired in Step S11, and calculates the first to fifth equivalent frictional forces respectively corresponding to the stroke speed, the sprung speed, the unsprung speed, the roll velocity, and the pitch velocity with reference to these information and the first to fifth frictional force maps 63A, 63B, 63C, 63D, 63E. The information on the first to fifth equivalent frictional forces calculated in this way is sent to the driving force calculation unit 55.

In Step S14 (driving force calculation process), the driving force calculation unit 55 of the ECU 15 inputs the information on the time-series signal of the stroke speed acquired in Step S12, and performs the driving force calculation process with reference to this information, the damping force map 61, and the first to fifth equivalent frictional forces calculated in Step S13, and thus calculates the driving force control signal including the target driving force.

More specifically, the driving force calculation unit 55 according to the sixth embodiment calculates the value of the damping force corresponding to the stroke speed with reference to the information on the time-series signal of the stroke speed and the stored contents (damping force changing in association with the change in the stroke speed) of the damping force map 61. Next, the adder 65 of the driving force calculation unit 55 according to the sixth embodiment adds the first to fifth equivalent frictional forces calculated in Step S13 to the value of the damping force calculated with reference to the damping force map 61, and thus generates the driving force control signal including the target driving force obtained by integrating the damping force and the first to fifth equivalent frictional forces.

In Step S15, the drive control unit 57 of the ECU 15 supplies the drive control power to the electric motor 31 provided in each of the plurality of electromagnetic actuators 13 in accordance with the driving force control signal obtained by the calculation in Step S14, and thus controls driving of the plurality of electromagnetic actuators 13.

In the electromagnetic suspension apparatus 11 according to the sixth embodiment, the damping force corresponding to the stroke speed is calculated with reference to the damping force map 61, while the first to fifth equivalent frictional forces are calculated with reference to the first to fifth frictional force maps 63A, 63B, 63C, 63D, 63E, and the electromagnetic actuator 13 is controlled to be driven using the target drive force obtained by integrating the damping force and the first to fifth equivalent frictional forces calculated in this way.

With the electromagnetic suspension apparatus 11 according to the sixth embodiment, the value of the first to fifth equivalent frictional forces equivalent to the mechanical frictional forces generated at each part of the electromagnetic actuator 13 respectively due to the stroke speed, the sprung speed, the unsprung speed, the roll velocity, and the pitch velocity are calculated, and the target driving force is corrected by adding the value of the first to fifth equivalent frictional forces thus calculated to the value of the damping force, and thus it is possible to quickly damp the vibration of the vehicle by the equivalent frictional force.

Here, when the target driving force is corrected by adding the value of the first equivalent frictional force corresponding to the stroke speed to the value of the damping force as in the electromagnetic suspension apparatus 11 according to the first embodiment, the vibration damping effect in an up-down direction of the sprung member and the unsprung member, the vibration damping effect in the rolling direction, and the vibration damping effect in the pitch direction can be obtained in the small stroke speed range, while there remains a problem that these three cannot be individually adjusted.

Therefore, in the electromagnetic suspension apparatus 11 according to the sixth embodiment, it is configured such that the target driving force is corrected by adding the values of the first to fifth equivalent frictional forces respectively corresponding to the stroke speed, the sprung speed, the unsprung speed, the roll velocity, and the pitch velocity to the value of the damping force. With the electromagnetic suspension apparatus 11 according to the sixth embodiment, since the target driving force is corrected by adding the value of the first to fifth equivalent frictional forces respectively calculated based on the stroke speed, the sprung speed, the unsprung speed, the roll velocity, and the pitch velocity, to the value of the damping force, it is possible to separately adjust effects of damping the vibration in the up-down direction of the sprung member and the unsprung member, the vibration in the rolling direction, and the vibration in the pitch direction. As a result, it is possible to contribute to improvement of the ride comfort, and improvement of the road holding performance, the roll preventing performance, and the pitch preventing performance.

[Block Configuration of Equivalent Frictional Force Calculation Unit 53, Driving Force Calculation Unit 55, and their Surroundings According to Seventh Embodiment]

Figure 12A:
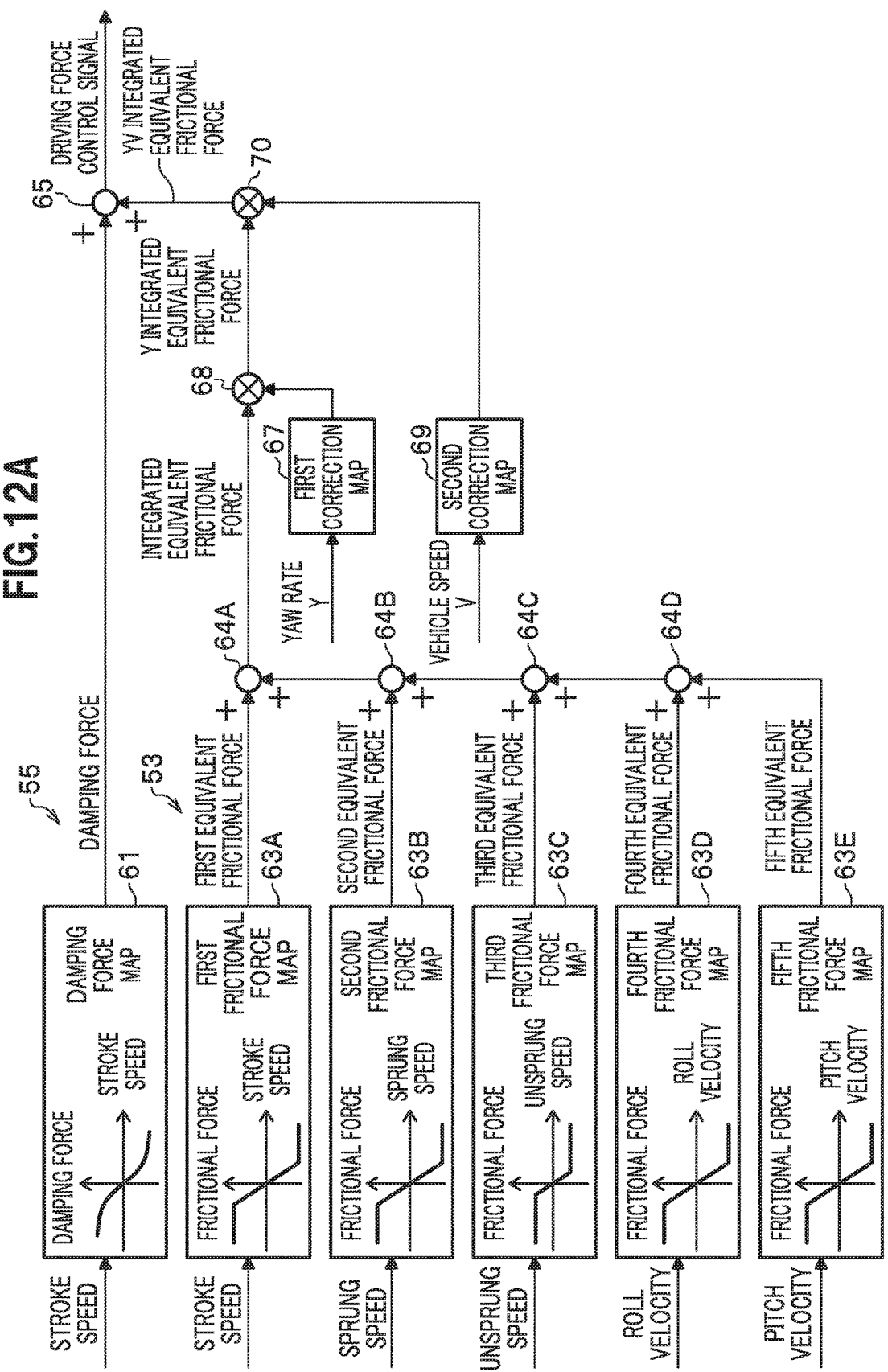
FIG. 12A is a block configuration diagram of an equivalent frictional force calculation unit, a driving force calculation unit, and their surroundings of the ECU provided in the electromagnetic suspension apparatus according to a seventh embodiment.

Next, the block configuration of the equivalent frictional force calculation unit 53, the driving force calculation unit 55, and their surroundings according to the seventh embodiment will be described with reference to FIG. 12A. FIG. 12A is a block configuration diagram of the equivalent frictional force calculation unit 53, the driving force calculation unit 55, and their surroundings according to the seventh embodiment.

Here, the driving force calculation unit 55 according to the sixth embodiment and the driving force calculation unit 55 according to the seventh embodiment have many constituent elements common to both. Therefore, the driving force calculation unit 55 according to the seventh embodiment will be described by focusing on different components between them. Note that the equivalent frictional force calculation unit 53 according to the sixth embodiment and the equivalent frictional force calculation unit 53 according to the seventh embodiment have mutually common configurations.

As shown in FIG. 12A, the driving force calculation unit 55 according to the seventh embodiment is configured to further include a first correction map 67, a second correction map 69, a first multiplier 68, and a second multiplier 70 in addition to the damping force map 61 and the adder 65 provided in the driving force calculation unit 55 according to the sixth embodiment.

The first correction map 67 is referred to when correcting a reference value of an integrated equivalent frictional force obtained by integrating the first to fifth equivalent frictional forces in accordance with the change in the yaw rate Y. In the first correction map 67, a value of an integrated equivalent frictional force correction ratio (hereinafter referred to as a "Y integrated equivalent frictional force correction ratio" in some cases) based on the yaw rate Y which changes in association with the change in the yaw rate Y acquired by the information acquisition unit 51. For the Y integrated equivalent frictional force correction ratio, a value between 0 and 1 (including 0 and 1) is used. The reference value of the integrated equivalent frictional force is multiplied by the Y integrated equivalent frictional force correction ratio. Thus, the reference value of the integrated equivalent frictional force is corrected to a value suitable for the yaw rate Y changing from moment to moment.

Figure 12B:
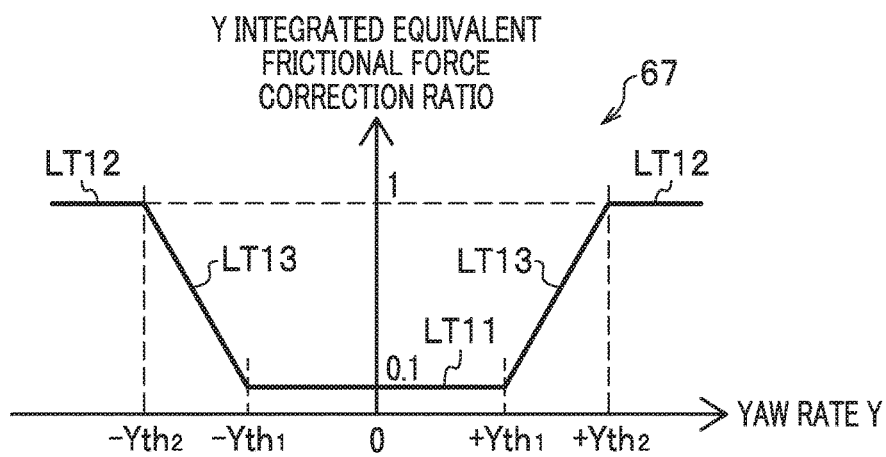
FIG. 12B is an explanatory diagram of a first correction map included in the driving force calculation unit shown in FIG. 12A.

Here, a Y integrated equivalent frictional force correction ratio characteristic stored in the first correction map 67 will be described with reference to FIG. 12B. The Y integrated equivalent frictional force correction ratio characteristic shown in FIG. 12B is set to a fixed value "0.1" as a value of a Y integrated equivalent frictional force correction ratio LT11 when the yaw rate Y is in a small turning range ($-Yth1<Y<+Yth1$). When the yaw rate Y is in a large turning range ($Y<-Yth2$, $Y>+Yth2$), a fixed value "1" is set as a value of a Y integrated equivalent frictional force correction ratio LT12. When the yaw rate Y is in a middle turning range ($-Yth2<Y<-Yth1$, $+Yth1<Y<+Yth2$), a variable value which gradually increases linearly as an absolute value of the yaw rate Y increases is set as a value of a Y integrated equivalent frictional force correction ratio LT13. As a threshold value Yth1 of the yaw rate Y, an appropriate value is set considering that the threshold value Yth1 is used for determining whether the value of the yaw rate Y is in the small turning range. As a threshold value Yth2 of the yaw rate Y, an appropriate value is set considering that the threshold value Yth2 is used for determining whether the value of the yaw rate Y is in the large turning range.

When the yaw rate Y is in the small turning range ($-Yth1<Y<+Yth1$), it is assumed that the vehicle 10 is traveling straight ahead or is gently turning. In such a case, priority is given to meeting a request to improve the ride comfort of the vehicle 10, as compared with a request to increase the road holding performance (steering stability) of the unsprung member. In order to meet this request, the target driving force which is the sum of the damping force and the integrated equivalent frictional force is reduced (the value of the integrated equivalent frictional force is reduced). Therefore, the fixed value "0.1" is set as the value of the Y integrated equivalent frictional force correction ratio LT11.

When the yaw rate Y is in the large turning range ($Y<-Yth2$, $Y>+Yth2$), it is assumed that the vehicle 10 is turning. In such a case, the priority is given to meeting the request to improve the road holding performance (steering stability) of the unsprung member, as compared with the request to improve the ride comfort of the vehicle 10. In order to meet this request, the target driving force which is the sum of the damping force and the integrated equivalent frictional force is increased (the value of the integrated equivalent frictional force is increased). Therefore, the fixed value "1" is set as the value of the Y integrated equivalent frictional force correction ratio LT12.

The second correction map 69 is referred to when the reference value of the integrated equivalent frictional force obtained by integrating the first to fifth equivalent friction forces is corrected according to the change in the vehicle speed V. In the second correction map 69, the value of the integrated equivalent frictional force correction ratio (hereinafter referred to as a "V integrated equivalent frictional force correction ratio" in some cases) based on the vehicle speed V which changes in association with the change in the vehicle speed V acquired by the information acquisition unit 51 is stored. For the V integrated equivalent frictional force correction ratio, the value between 0 and 1 (including 0 and 1) is used. The reference value of the integrated equivalent frictional force is multiplied by the V equivalent frictional force correction ratio. Thus, the reference value of the integrated equivalent frictional force is corrected to a value suitable for the vehicle speed V changing from moment to moment.

Figure 12C:
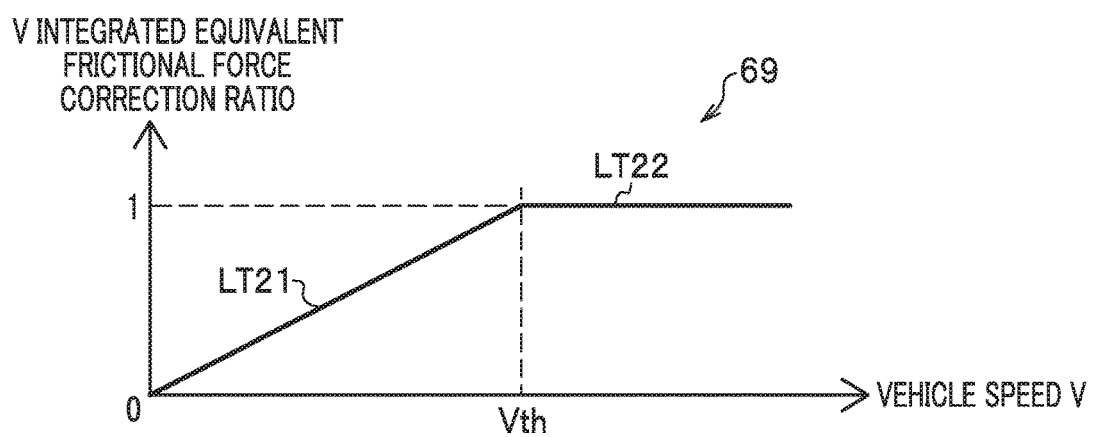
FIG. 12C is an explanatory diagram of a second correction map included in the driving force calculation unit shown in FIG. 12A.

Here, the V integrated equivalent frictional force correction ratio characteristic stored in the second correction map 69 will be described with reference to FIG. 12C. When the vehicle speed V is in a low middle speed range (V=<Vth) where the vehicle speed V is not higher than a vehicle speed threshold value Vth, a variable value which gradually increases linearly from 0 to 1 as the vehicle speed V increases is set as a value of a V integrated equivalent frictional force correction ratio LT21. When the vehicle speed V is in a high speed range (V>Vth) where the vehicle speed V exceeds the vehicle speed threshold value Vth, the fixed value "1" is set as a value of a V integrated equivalent frictional force correction ratio LT22. As the vehicle speed threshold value Vth, an appropriate value is set considering that the threshold value Vth is used for determining whether the vehicle speed V is in the low middle speed range (high speed range).

When the vehicle speed V is in the low middle speed range (V=<Vth), the priority is given to meeting the request to improve the ride comfort of the vehicle 10, as compared with the request to improve the road holding performance (steering stability) of the unsprung member. In order to meet this request, the target driving force which is the sum of the damping force and the integrated equivalent frictional force is reduced (the value of the integrated equivalent frictional force is reduced). Therefore, as the value of the V integrated equivalent frictional force correction ratio LT21, the variable value which gradually increases linearly from 0 to 1 as the vehicle speed V increases is set.

When the vehicle speed V is in the high speed range (V>Vth) exceeding the vehicle speed threshold value Vth, the priority is given to meeting the request to improve the road holding performance (steering stability) of the unsprung member, as compared with the request to improve the ride comfort of the vehicle 10. In order to meet this request, the target driving force which is the sum of the damping force and the integrated equivalent frictional force is increased (the value of the integrated equivalent frictional force is increased). Therefore, the fixed value "1" is set as the value of the V integrated equivalent frictional force correction ratio LT22.

The first multiplier 68 multiplies the reference value of the integrated equivalent frictional force obtained by integrating the first to fifth equivalent frictional forces by the value of the Y integrated equivalent frictional force correction ratio calculated based on the yaw rate Y in the first correction map 67, thereby outputting a correction value of the Y integrated equivalent frictional force corrected based on the yaw rate Y. The correction value of the Y integrated equivalent friction force, which is the output of the first multiplier 68, is sent to the second multiplier 70.

The second multiplier 70 multiplies the correction value of the Y integrated equivalent frictional force which is the output of the first multiplier 68 by the value of the V integrated equivalent frictional force correction ratio calculated based on the vehicle speed V in the second correction map 69, thereby outputting a correction value of a YV integrated equivalent frictional force corrected based on the vehicle speed V. The correction value of the YV integrated frictional force, which is the output of the second multiplier 70, is sent to the adder 65.

[Operation of Electromagnetic Suspension Apparatus 11 According to Seventh Embodiment]

Next, the operation of the electromagnetic suspension apparatus 11 according to the seventh embodiment of the present invention will be described with reference to FIG. 5.

In Step S11 (various information acquisition) shown in FIG. 5, the information acquisition unit 51 of the ECU 15 acquires information on the stroke position of the electromagnetic actuator 13, the sprung acceleration detected by the sprung acceleration sensor 41, the unsprung acceleration detected by the unsprung acceleration sensor 42, the roll velocity detected by the roll velocity sensor 43, the pitch velocity detected by the pitch velocity sensor 44, the yaw rate Y detected by the yaw rate sensor 47, and the vehicle speed V detected by the vehicle speed sensor 45. Information on time-series signals of the roll velocity and the pitch velocity acquired by the information acquisition unit 51 is sent to the equivalent frictional force calculation unit 53.

In Step S12 (stroke speed calculation), the information acquisition unit 51 of the ECU 15 acquires information on the time-series signal of the stroke speed by time-differentiating the information on the stroke position acquired in Step S11. The information on the time-series signal of the stroke speed acquired by the information acquisition unit 51 is sent to the driving force calculation unit 55. Further, the information acquisition unit 51 of the ECU 15 acquires information on the time-series signals of the sprung speed and the unsprung speed by respectively time-integrating the information on the sprung acceleration and the unsprung acceleration acquired in Step S11. Information on the time-series signals of the sprung speed and the unsprung speed acquired by the information acquisition unit 51 is sent to the equivalent frictional force calculation unit 53.

In Step S13 (equivalent frictional force calculation), the equivalent frictional force calculation unit 53 of the ECU 15 inputs the information on the time-series signals of the stroke speed of the electromagnetic actuator 13, the sprung speed, the unsprung speed, the roll velocity, and the pitch velocity acquired in Step S11, and calculates the values of the first to fifth equivalent frictional forces respectively corresponding to the stroke speed, the sprung speed, the unsprung speed, the roll velocity, and the pitch velocity with reference to these information and the first to fifth frictional force maps 63A, 63B, 63C, 63D, 63E. The information on the first to fifth equivalent frictional forces calculated in this way is sent to the driving force calculation unit 55.

In Step S14 (driving force calculation process), the driving force calculation unit 55 of the ECU 15 inputs the information on the time-series signal of the stroke speed acquired in Step S12, and performs the driving force calculation process with reference to this information, the damping force map 61, and the value of the first to fifth equivalent frictional forces calculated in Step S13, and thus calculates the driving force control signal including the target driving force.

More specifically, the driving force calculation unit 55 according to the seventh embodiment calculates the value of the damping force corresponding to the stroke speed with reference to the information on the time-series signal of the stroke speed and the stored contents (damping force changing in association with the change in the stroke speed) of the damping force map 61. Next, the driving force calculation unit 55 according to the seventh embodiment adds the values of the first to fifth equivalent frictional forces, thereby obtaining the reference value of the integrated equivalent frictional force obtained by integrating the first to fifth equivalent frictional forces. The reference value of the integrated equivalent frictional force is sent to the first multiplier 68. The first multiplier 68 multiplies the reference value of the integrated equivalent frictional force by the value of the Y integrated equivalent frictional force correction ratio calculated based on the yaw rate Y in the first correction map 67, thereby outputting the correction value of the Y integrated equivalent frictional force corrected based on the yaw rate Y. The correction value of the Y integrated equivalent frictional force, which is the output of the first multiplier 68, is sent to the second multiplier 70. The second multiplier 70 multiplies the correction value of the Y integrated equivalent friction force which is the output of the first multiplier 68 by the value of the V integrated equivalent frictional force correction ratio calculated based on the vehicle speed V in the second correction map 69, thereby outputting the correction value of the YV integrated equivalent frictional force corrected based on the vehicle speed V. The correction value of the YV integrated frictional force, which is the output of the second multiplier 70, is sent to the adder 65. Next, the adder 65 of the driving force calculation unit 55 according to the seventh embodiment adds the correction value of the YV integrated equivalent frictional force, which is the output of the second multiplier 70, to the value of the damping force calculated with reference to the damping force map 61, and thus generates the driving force control signal including the target driving force obtained by integrating the damping force and the YV integrated equivalent frictional force.

In Step S15, the drive control unit 57 of the ECU 15 supplies the drive control power to the electric motor 31 provided in each of the plurality of electromagnetic actuators 13 in accordance with the driving force control signal obtained by the calculation in Step S14, and thus controls driving of the plurality of electromagnetic actuators 13.

In the electromagnetic suspension apparatus 11 according to the seventh embodiment, the damping force corresponding to the stroke speed is calculated with reference to the damping force map 61, while the first to fifth equivalent frictional forces are calculated with reference to the first to fifth frictional force maps 63A, 63B, 63C, 63D, 63E, and the reference value of the integrated equivalent frictional force obtained by integrating the first to fifth equivalent frictional forces is calculated. The reference value of the integrated equivalent frictional force is corrected based on the yaw rate Y and the vehicle speed V which are indicators (running state quantities) indicating the running state of the vehicle 10. Thus, the correction value of the integrated equivalent frictional force corresponding to the running state of the vehicle 10 is obtained. Then, the electromagnetic actuator 13 is controlled to be driven using the target driving force obtained by integrating the calculated damping force and the correction value of the integrated equivalent frictional force.

Here, when the target driving force is corrected by adding the value of the first equivalent frictional force corresponding to the stroke speed to the value of the damping force as in the electromagnetic suspension apparatus 11 according to the first embodiment, the vibration damping effect in an up-down direction of the sprung member and the unsprung member, the vibration damping effect in the rolling direction, and the vibration damping effect in the pitch direction can be obtained in the small stroke speed range, while there remain a problem that these three cannot be individually adjusted and a problem that the vibration damping effects of these three cannot be adjusted in response to the running state of the vehicle 10.

Therefore, in the electromagnetic suspension apparatus 11 according to the seventh embodiment, it is configured such that the first to fifth equivalent frictional forces of the same magnitude as the mechanical frictional force generated at each part of the electromagnetic actuator 13 respectively due to the stroke speed, the sprung speed, the unsprung speed, the roll velocity, and the pitch velocity are calculated, and the target driving force is corrected by adding the correction value of the integrated equivalent frictional force corrected in response to the running state of the vehicle 10 to the value of the damping force, with respect to the reference value of the integrated equivalent frictional force obtained by integrating the thus calculated first to fifth equivalent frictional forces.

With the electromagnetic suspension apparatus 11 of the seventh embodiment, it is possible to quickly reduce an influence of the mechanical frictional force derived from the stroke speed, the sprung speed, the unsprung speed, the roll velocity, and the pitch velocity, and to finely adjust the degree of reduction in response to the running state of the vehicle 10. For example, when the vehicle is traveling at high speed or turning, and high road holding performance (steering stability) is required, it is possible to achieve both the vibration damping performance (road holding performance) of the unsprung member in the small stroke speed range and vibration isolation performance to the sprung member at high level by increasing the integrated equivalent frictional force (improving the road holding performance of the unsprung member) as compared with when traveling at low middle speed or traveling straight ahead. As a result, it is possible to greatly contribute to improvement of the ride comfort, and improvement of the road holding performance, the roll preventing performance, and the pitch preventing performance.

[Operational Effect of Electromagnetic Suspension Apparatus 11 According to the Present Invention]

Next, an operational effect of the electromagnetic suspension apparatus 11 according to the present invention will be described. The electromagnetic suspension apparatus 11 according to a first aspect includes the electromagnetic actuator 13 that is provided in parallel with the spring member provided between the vehicle body and the wheel of the vehicle 10 and generates the driving force related to vibration damping of the vehicle body, the information acquisition unit 51 that acquires at least one of vehicle state information on the stroke speed of the electromagnetic actuator 13, the sprung speed, the unsprung speed, the roll velocity, and the pitch velocity, the equivalent frictional force calculation unit 53 that calculates the equivalent frictional force (first to fifth equivalent frictional forces) of the electromagnetic actuator 13 based on the vehicle state information acquired by the information acquisition unit 51, and the ECU (driving force control unit) 15 that calculates the target driving force of the electromagnetic actuator 13 and controls the driving force of the electromagnetic actuator 13 using the calculated target driving force. The ECU (driving force control unit) 15 corrects the target driving force based on the equivalent frictional force (first to fifth equivalent frictional forces) calculated by the equivalent frictional force calculation unit 53.

With the electromagnetic suspension apparatus 11 according to the first aspect, since the ECU (driving force control unit) 15 corrects the target driving force based on the equivalent frictional force (first to fifth equivalent frictional forces) calculated by the equivalent frictional force calculation unit 53, it is possible to apply the frictional force equivalent to the mechanical frictional force using a power of the electric electromagnetic actuator 13, thereby quickly damping the vibration of the vehicle by the equivalent frictional force.

The electromagnetic suspension apparatus 11 according to a second aspect includes the electromagnetic actuator 13 that is provided in parallel with the spring member provided between the vehicle body and the wheel of the vehicle 10 and generates the driving force related to vibration damping of the vehicle body, the information acquisition unit 51 that acquires at least one of vehicle state information on the stroke speed of the electromagnetic actuator 13, the sprung speed, the unsprung speed, the roll velocity, and the pitch velocity, the equivalent frictional force calculation unit 53 that calculates the equivalent frictional force (first to fifth equivalent frictional forces) of the electromagnetic actuator 13 based on the vehicle state information acquired by the information acquisition unit 51, and the ECU (driving force control unit) 15 that calculates the target driving force of the electromagnetic actuator 13 based on the stroke speed of the electromagnetic actuator 13 acquired by the information acquisition unit 51, and controls the driving force of the electromagnetic actuator 13 using the calculated target driving force. The ECU (driving force control unit) 15 corrects the target driving force based on the equivalent frictional force (first to fifth equivalent frictional forces) calculated by the equivalent frictional force calculation unit 53.

With the electromagnetic suspension apparatus 11 according to the second aspect, since the ECU (driving force control unit) 15 corrects the target driving force based on the equivalent frictional force (first to fifth equivalent frictional forces) calculated by the equivalent frictional force calculation unit 53 similarly to the electromagnetic suspension apparatus 11 according to the first aspect, it is possible to quickly damp the vibration of the vehicle by the equivalent frictional force.

The electromagnetic suspension apparatus 11 according to a third aspect is the electromagnetic suspension apparatus 11 according to the first aspect or the second aspect, wherein the information acquisition unit 51 further acquires at least one running state quantity of the yaw rate Y, the vehicle speed V, a lateral acceleration, a steering angle, and a steering torque, and the ECU (driving force control unit) 15 corrects the equivalent frictional force (first to fifth equivalent frictional forces) calculated by the equivalent frictional force calculation unit 53 based on the running state quantity acquired by the information acquisition unit 51 and corrects the target frictional force based on the corrected equivalent frictional force (correction value of the integrated equivalent frictional force).

With the electromagnetic suspension apparatus 11 according to the third aspect, since the equivalent frictional force calculated by the equivalent frictional force calculation unit 53 is corrected, and the target driving force is corrected based on the corrected equivalent frictional force, it is possible to quickly damp the vibration of the vehicle by the equivalent frictional force and to finely adjust the damping control in response to the running state of the vehicle 10.

The electromagnetic suspension apparatus 11 according to a fourth aspect is the electromagnetic suspension apparatus 11 according to the third aspect, wherein the information acquisition unit 51 further acquires the yaw rate Y as the running state quantity, and when the yaw rate Y acquired by the information acquisition unit 51 is not more than a predetermined threshold value Yth2, the ECU (driving force control unit) 15 corrects to reduce the equivalent frictional force (first to fifth equivalent frictional forces) calculated by the equivalent frictional force calculation unit 53 as compared with when the yaw rate Y exceeds the threshold value Yth2, and corrects the target driving force based on the corrected equivalent frictional force.

Here, when the yaw rate Y is not more than the predetermined threshold value Yth2, it is assumed that the yaw rate Y is not in the large turning range (the yaw rate Y is in the small turning range or in the middle turning range). In such a case, the priority is given to meeting the request to improve the ride comfort of the vehicle 10, as compared with the request to improve the road holding performance (steering stability) of the unsprung member. In order to meet this request, the target driving force is reduced (the value of the integrated equivalent frictional force is reduced). Therefore, in the electromagnetic suspension apparatus 11 according to the fourth aspect, when the yaw rate Y is not more than the threshold value Yth2, the equivalent frictional force calculated by the equivalent frictional force calculation unit 53 is corrected to be reduced as compared with when the yaw rate Y exceeds the threshold value Yth2, and the target driving force is corrected based on the corrected equivalent frictional force.

In the electromagnetic suspension apparatus 11 according to the fourth aspect, when the yaw rate Y is not more than the threshold value Yth2, the value of the equivalent frictional force calculated by the equivalent frictional force calculation unit 53 is corrected to be reduced as compared with when the yaw rate Y exceeds the threshold value Yth2. That is, when the yaw rate Y is in the small turning range or the middle turning range (the priority is given to the ride comfort rather than the road holding performance), the equivalent frictional force is reduced (the vibration isolation performance to the sprung member is increased) as compared with when high road holding performance is required during turning. As a result, it is possible to achieve both the road holding performance (vibration damping performance) of the unsprung member in the small stroke speed range and the vibration isolation performance to the sprung member at high level.

The electromagnetic suspension apparatus 11 according to a fifth aspect is the electromagnetic suspension apparatus 11 according to the third aspect, wherein the information acquisition unit 51 acquires the vehicle speed V as the running state quantity, and when the vehicle speed V acquired by the information acquisition unit 51 is not more than a predetermined vehicle speed threshold value Vth, the ECU (driving force control unit) 15 corrects to reduce the equivalent frictional force (first to fifth equivalent frictional forces) calculated by the equivalent frictional force calculation unit 53 as compared with when the vehicle speed V exceeds the vehicle speed threshold value Vth, and corrects the target driving force based on the corrected equivalent frictional force.

Here, when the vehicle speed V is not more than the predetermined vehicle speed threshold value Vth, it is assumed that the vehicle 10 is normally traveling without requiring particularly high steering stability. In such a case, the priority is given to meeting the request to improve the ride comfort of the vehicle 10, as compared with the request to improve the road holding performance (steering stability) of the unsprung member. In order to meet this request, the target driving force is reduced (the value of the integrated equivalent frictional force is reduced). Therefore, in the electromagnetic suspension apparatus 11 according to the fifth aspect, when the vehicle speed V is not more than the vehicle speed threshold value Vth, the equivalent frictional force calculated by the equivalent frictional force calculation unit 53 is corrected to be reduced as compared with when the vehicle speed V exceeds the vehicle speed threshold value Vth, and the target driving force is corrected based on the corrected equivalent frictional force.

In the electromagnetic suspension apparatus 11 according to the fifth aspect, when the vehicle speed V is not more than the vehicle speed threshold value Vth, the value of the equivalent frictional force calculated by the equivalent frictional force calculation unit 53 is corrected to be reduced as compared with when the vehicle speed V exceeds the vehicle speed threshold value Vth. That is, when the vehicle is traveling at low middle speed (the priority is given to the ride comfort rather than the road holding performance), the equivalent frictional force is reduced (the vibration isolation performance to the sprung member is increased) as compared with when high road holding performance is required during high speed traveling. As a result, it is possible to achieve both the road holding performance of the unsprung member in the small stroke speed range and the vibration isolation performance to the sprung member at high level.

OTHER EMBODIMENTS

The plural embodiments described above are examples of implementation of the present invention. Therefore, the technical scope of the present invention should not be interpreted limitedly by these. This is because the present invention can be implemented in various forms without departing from the spirits and scope of the present invention.

For example, in the description of the internal configuration of the ECU 15 commonly provided in the electromagnetic suspension apparatus 11 of the present invention, an example of the information acquisition unit 51 that acquires the information on the stroke speed of the electromagnetic actuator 13, the sprung speed, the unsprung speed, the roll velocity, the pitch velocity, the yaw rate Y, and the vehicle speed V has been described, however, the present invention is not limited to this example. The information acquisition unit may be the information acquisition unit 51 (corresponding to the first embodiment) that acquires information on the stroke speed, the information acquisition unit 51 (corresponding to the second embodiment) that acquires information on the stroke speed and the sprung speed, the information acquisition unit 51 (corresponding to the third embodiment) that acquires information on the stroke speed and the unsprung speed, the information acquisition unit 51 (corresponding to the fourth embodiment) that acquires information on the stroke speed and the roll velocity, the information acquisition unit 51 (corresponding to the fifth embodiment) that acquires information on the stroke speed and the pitch velocity, or the information acquisition unit 51 (corresponding to the sixth embodiment) that acquires information on the stroke speed, the sprung speed, the unsprung speed, the roll velocity, and the pitch velocity.

In the description of the internal configuration of the ECU 15 of the electromagnetic suspension apparatus 11 according to the seventh embodiment of the present invention, an example of the information acquisition unit 51 that acquires the information on the stroke speed of the electromagnetic actuator 13, the sprung speed, the unsprung speed, the roll velocity, the pitch velocity, the yaw rate Y, and the vehicle speed V has been described, however, the present invention is not limited to this example. In the information acquisition unit 51 of the ECU 15 of the electromagnetic suspension apparatus 11 according to a modification of the seventh embodiment of the present invention, it may be configured to acquire one of the stroke speed of the electromagnetic actuator 13, the sprung speed, the unsprung speed, the roll velocity, the pitch velocity, the yaw rate Y, and the vehicle speed V. In the information acquisition unit 51 of the ECU 15 of the electromagnetic suspension apparatus 11 according to the modification of the seventh embodiment of the present invention, it may be configured to acquire at least one of the stroke direction, the lateral acceleration, the steering angle, the steering torque, and an ambient temperature around the electromagnetic actuator 13, in addition to the information on the stroke speed of the electromagnetic actuator 13, the sprung speed, the unsprung speed, the roll velocity, the pitch velocity, the yaw rate Y, and the vehicle speed V. In this case, in the electromagnetic suspension apparatus 11 according to the modification of the seventh embodiment of the present invention, it is configured such that the reference value of the integrated equivalent frictional force obtained by integrating the first to fifth equivalent frictional forces is corrected based on the information on the stroke direction of the electromagnetic actuator 13, the lateral acceleration of the vehicle 10, the steering angle, the steering torque, or the ambient temperature around the electromagnetic actuator 13.

In the description of the electromagnetic suspension apparatus 11 according to the seventh embodiment of the present invention, an example of the values considered to be appropriate as the integrated equivalent frictional force correction ratios LT11, LT12, LT13, LT21, LT22 has been described, however, the present invention is not limited to this example. As the integrated equivalent frictional force correction ratios LT11, LT12, LT13, LT21, LT22, appropriate values obtained by experiments, simulations or the like may be used. Further, a correction ratio map may be provided for each of the first to fifth equivalent friction forces, and a magnitude of each equivalent frictional force may be more finely adjusted.

Further, in the description of the embodiment according to the present invention, an example in which a total of four electromagnetic actuators 13 are arranged in both the front wheels (left front wheel/right front wheel) and the rear wheels (left rear wheel/right rear wheel) has been described, however, the present invention is not limited to this example. A configuration in which two electromagnetic actuators 13 are conveniently arranged in either the front wheel or the rear wheel may be adopted.

Finally, in the description of the embodiment according to the present invention, the drive control unit 49 that independently controls the driving of the plurality of electromagnetic actuators 13 has been described. Specifically, the drive control unit 49 may independently control the driving of the electromagnetic actuators 13 respectively provided in the four wheels, separately for wheels. Further, the drive control unit 49 may independently control the driving of the electromagnetic actuators 13 respectively provided for the four wheels, separately for the front wheels and for the rear wheels, or separately for the left wheels and the right wheels.

REFERENCE SIGNS LIST

10: vehicle
11: electromagnetic suspension apparatus
13: electromagnetic actuator
15: ECU (driving force control unit)
51: information acquisition unit
53: equivalent frictional force calculation unit
55: driving force calculation unit
57: drive control unit V: vehicle speed
Y: yaw rate

The invention claimed is:

1. An electromagnetic suspension apparatus comprising:
an electromagnetic actuator that is provided in parallel with a spring member provided between a vehicle body and a wheel of a vehicle and generates a driving force related to vibration damping of the vehicle body;
an information acquisition unit that acquires at least one of vehicle state information on a stroke speed of the electromagnetic actuator, a sprung speed, an unsprung speed, a roll velocity, and a pitch velocity;
an equivalent frictional force calculation unit that calculates an equivalent frictional force of the electromagnetic actuator based on the vehicle state information acquired by the information acquisition unit; and
a driving force control unit that calculates a target driving force of the electromagnetic actuator and controls a driving force of the electromagnetic actuator using the calculated target driving force,
wherein
the information acquisition unit acquires a vehicle speed as a running state quantity, and
when the vehicle speed acquired by the information acquisition unit is not more than a predetermined vehicle speed threshold, the driving force control unit corrects to reduce the equivalent frictional force calculated by the equivalent frictional force calculation unit as compared with when the vehicle speed exceeds the vehicle speed threshold, and corrects the target driving force based on the corrected equivalent frictional force.

2. The electromagnetic suspension apparatus according to claim 1, wherein
the information acquisition unit further acquires at least one running state quantity of a yaw rate, a lateral acceleration, a steering angle, and a steering torque, and
the driving force control unit corrects the equivalent frictional force calculated by the equivalent frictional force calculation unit based on the running state quantity acquired by the information acquisition unit and corrects the target frictional force based on the corrected equivalent frictional force.

3. An electromagnetic suspension apparatus comprising:
an electromagnetic actuator that is provided in parallel with a spring member provided between a vehicle body and a wheel of a vehicle and generates a driving force related to vibration damping of the vehicle body;
an information acquisition unit that acquires at least one of vehicle state information on a stroke speed of the electromagnetic actuator, a sprung speed, an unsprung speed, a roll velocity, and a pitch velocity;
an equivalent frictional force calculation unit that calculates an equivalent frictional force of the electromagnetic actuator based on the vehicle state information acquired by the information acquisition unit; and
a driving force control unit that calculates a target driving force of the electromagnetic actuator based on the stroke speed of the electromagnetic actuator acquired by the information acquisition unit, and controls a driving force of the electromagnetic actuator using the calculated target driving force,
wherein
the information acquisition unit acquires a yaw rate as a running state quantity, and
when the yaw rate acquired by the information acquisition unit is not more than a predetermined yaw rate threshold value, the driving force control unit corrects to reduce the equivalent frictional force calculated by the equivalent frictional force calculation unit as compared with when the yaw rate exceeds the yaw rate threshold value, and corrects the target driving force based on the corrected equivalent frictional force.

4. The electromagnetic suspension apparatus according to claim 3, wherein
the information acquisition unit further acquires at least one running state quantity of a vehicle speed, a lateral acceleration, a steering angle, and a steering torque, and
the driving force control unit corrects the equivalent frictional force calculated by the equivalent frictional force calculation unit based on the running state quantity acquired by the information acquisition unit and corrects the target frictional force based on the corrected equivalent frictional force.

5. An electromagnetic suspension apparatus comprising:
an electromagnetic actuator that is provided in parallel with a spring member provided between a vehicle body and a wheel of a vehicle and generates a driving force related to vibration damping of the vehicle body;
an information acquisition unit that acquires at least one of vehicle state information on a stroke speed of the electromagnetic actuator, a sprung speed, an unsprung speed, a roll velocity, and a pitch velocity;
an equivalent frictional force calculation unit that calculates an equivalent frictional force of the electromagnetic actuator based on the vehicle state information acquired by the information acquisition unit; and
a driving force control unit that calculates a target driving force of the electromagnetic actuator based on the stroke speed of the electromagnetic actuator acquired by the information acquisition unit, and controls a driving force of the electromagnetic actuator using the calculated target driving force,
wherein
the information acquisition unit acquires a vehicle speed as a running state quantity, and
when the vehicle speed acquired by the information acquisition unit is not more than a predetermined vehicle speed threshold, the driving force control unit corrects to reduce the equivalent frictional force calculated by the equivalent frictional force calculation unit as compared with when the vehicle speed exceeds the vehicle speed threshold, and corrects the target driving force based on the corrected equivalent frictional force.

6. The electromagnetic suspension apparatus according to claim 5, wherein
the information acquisition unit further acquires at least one running state quantity of a yaw rate, a lateral acceleration, a steering angle, and a steering torque, and
the driving force control unit corrects the equivalent frictional force calculated by the equivalent frictional force calculation unit based on the running state quantity acquired by the information acquisition unit and corrects the target frictional force based on the corrected equivalent frictional force.

7. An electromagnetic suspension apparatus comprising:
an electromagnetic actuator that is provided in parallel with a spring member provided between a vehicle body and a wheel of a vehicle and generates a driving force related to vibration damping of the vehicle body;
an information acquisition unit that acquires at least one of vehicle state information on a stroke speed of the electromagnetic actuator, a sprung speed, an unsprung speed, a roll velocity, and a pitch velocity;

an equivalent frictional force calculation unit that calculates an equivalent frictional force of the electromagnetic actuator based on the vehicle state information acquired by the information acquisition unit; and a driving force control unit that calculates a target driving force of the electromagnetic actuator based on the stroke speed of the electromagnetic actuator acquired by the information acquisition unit, and controls a driving force of the electromagnetic actuator using the calculated target driving force, wherein the information acquisition unit acquires a yaw rate as a running state quantity, and when the yaw rate acquired by the information acquisition unit is not more than a predetermined yaw rate threshold value, the driving force control unit corrects to reduce the equivalent frictional force calculated by the equivalent frictional force calculation unit as compared with when the yaw rate exceeds the yaw rate threshold value, and corrects the target driving force based on the corrected equivalent frictional force.

8. The electromagnetic suspension apparatus according to claim 7, wherein the information acquisition unit further acquires at least one running state quantity of a vehicle speed, a lateral acceleration, a steering angle, and a steering torque, and the driving force control unit corrects the equivalent frictional force calculated by the equivalent frictional force calculation unit based on the running state quantity acquired by the information acquisition unit and corrects the target frictional force based on the corrected equivalent frictional force.

* * * * *